United States Patent
Berger

(10) Patent No.: US 7,546,820 B2
(45) Date of Patent: Jun. 16, 2009

(54) VARIABLE COMPRESSION RATIO ENGINE WITH LOST MOTION COUPLING

(75) Inventor: Alvin H. Berger, Brownstown, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 11/931,184

(22) Filed: Oct. 31, 2007

(65) Prior Publication Data
US 2009/0107467 A1    Apr. 30, 2009

(51) Int. Cl.
*F02B 75/04*    (2006.01)
(52) U.S. Cl. .................................. 123/48 B; 123/78 BA
(58) Field of Classification Search ............... 123/48 B, 123/78 B, 78 BA
See application file for complete search history.

(56) References Cited

U.S. PATENT DOCUMENTS

| | | | |
|---|---|---|---|
| 2,398,640 A | 4/1946 | Hickey | |
| 2,427,668 A | 9/1947 | Gill | |
| 4,687,348 A | 8/1987 | Naruoka et al. | |
| 4,864,975 A | 9/1989 | Hasegawa | |
| 5,417,185 A | * 5/1995 | Beattie | 123/48 B |
| 6,499,446 B1 | 12/2002 | Rao et al. | |
| 7,469,663 B1 | 12/2008 | Berger | |

FOREIGN PATENT DOCUMENTS

| | | |
|---|---|---|
| EP | 438121 | 7/1991 |
| GB | 412781 A | 7/1934 |

* cited by examiner

*Primary Examiner*—Noah Kamen
(74) *Attorney, Agent, or Firm*—Dickinson Wright PLLC; Julia Voutyras

(57) ABSTRACT

A variable compression ratio piston (26) and connecting rod (18) assembly for an internal combustion engine (14) includes an eccentric bushing (28) that carries a piston pin bushing (42) and contains a journaled portion (48) held in the rod bore (24) of the connecting rod (18). The eccentric bushing (28) can be selectively rotated between either of two angle adjusted positions to effect a change in the height of the piston (26) relative to the connecting rod (18), and thus change the compression ratio of the assembly. A latch (50) mechanism is actuated by oil jets (90, 91) external to the connecting rod (18). The latch (50) includes bolts (54, 56) with tapered tips that seat in oblong holes (60, 62) in a flange plate (58) to reduce destructive lash. A resilient stop post (80) bears the brunt of stresses associated with stopping the flange plate (58) during switching events to protect the latching bolts (54, 56).

16 Claims, 18 Drawing Sheets

LOW COMPRESSION RATIO

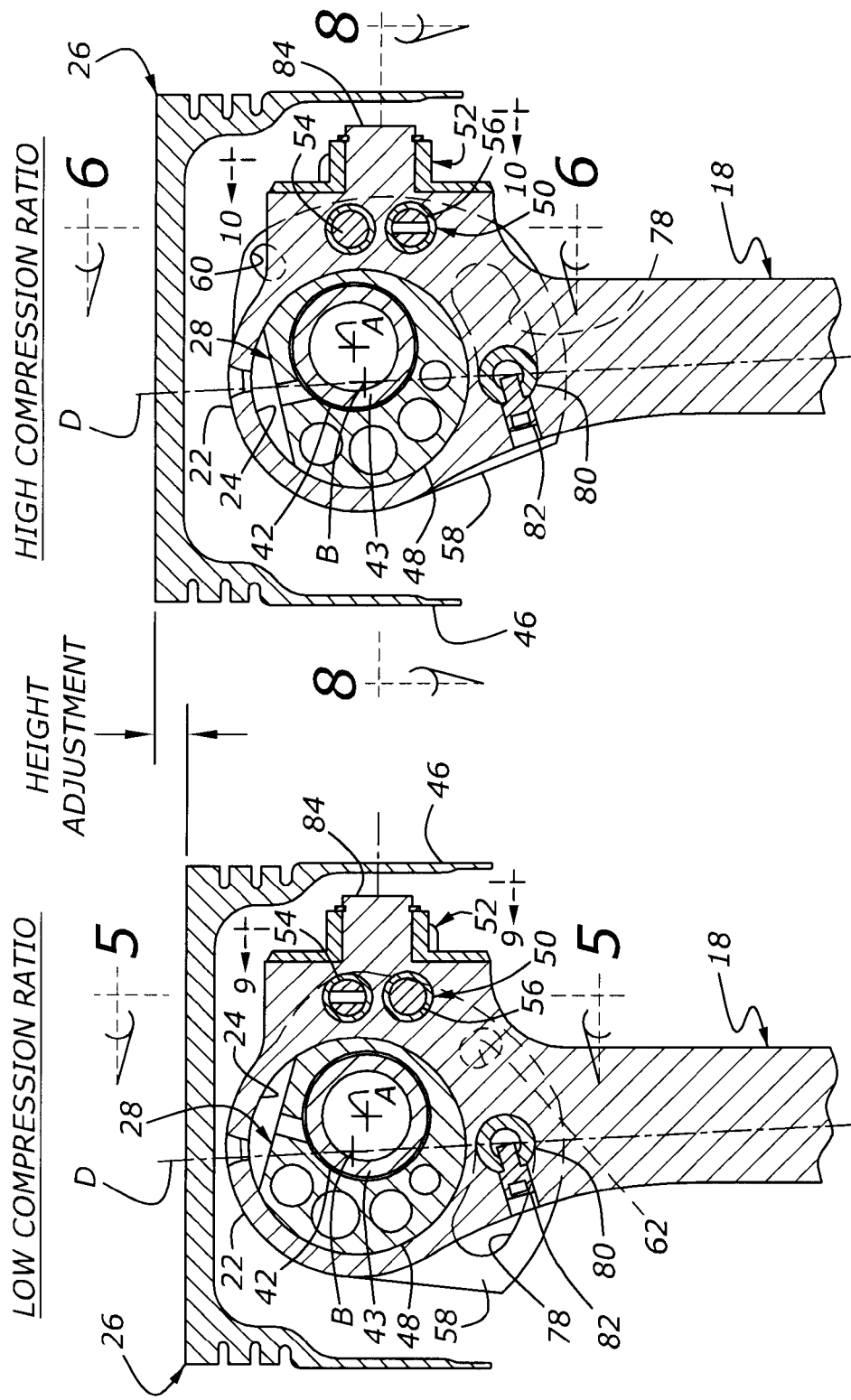

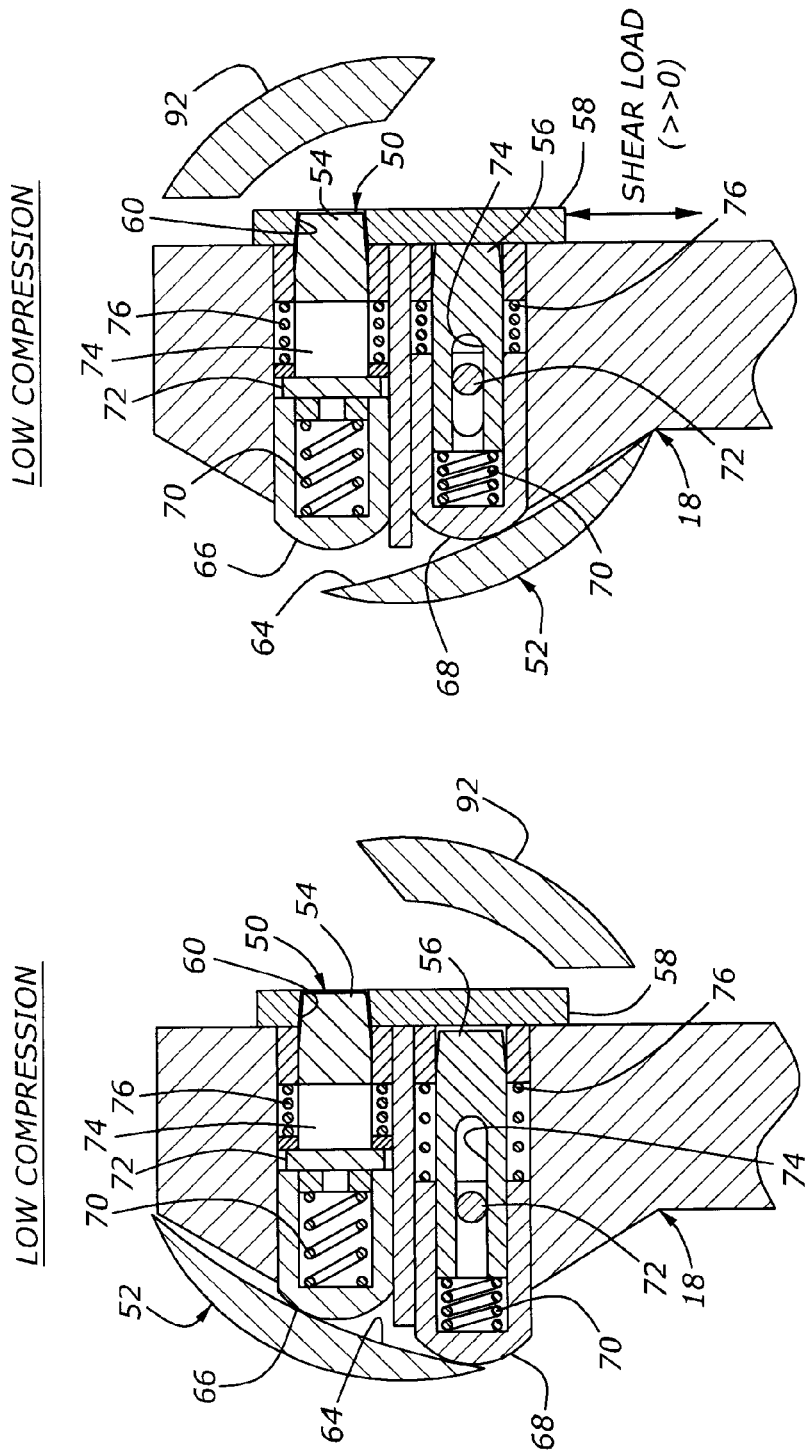

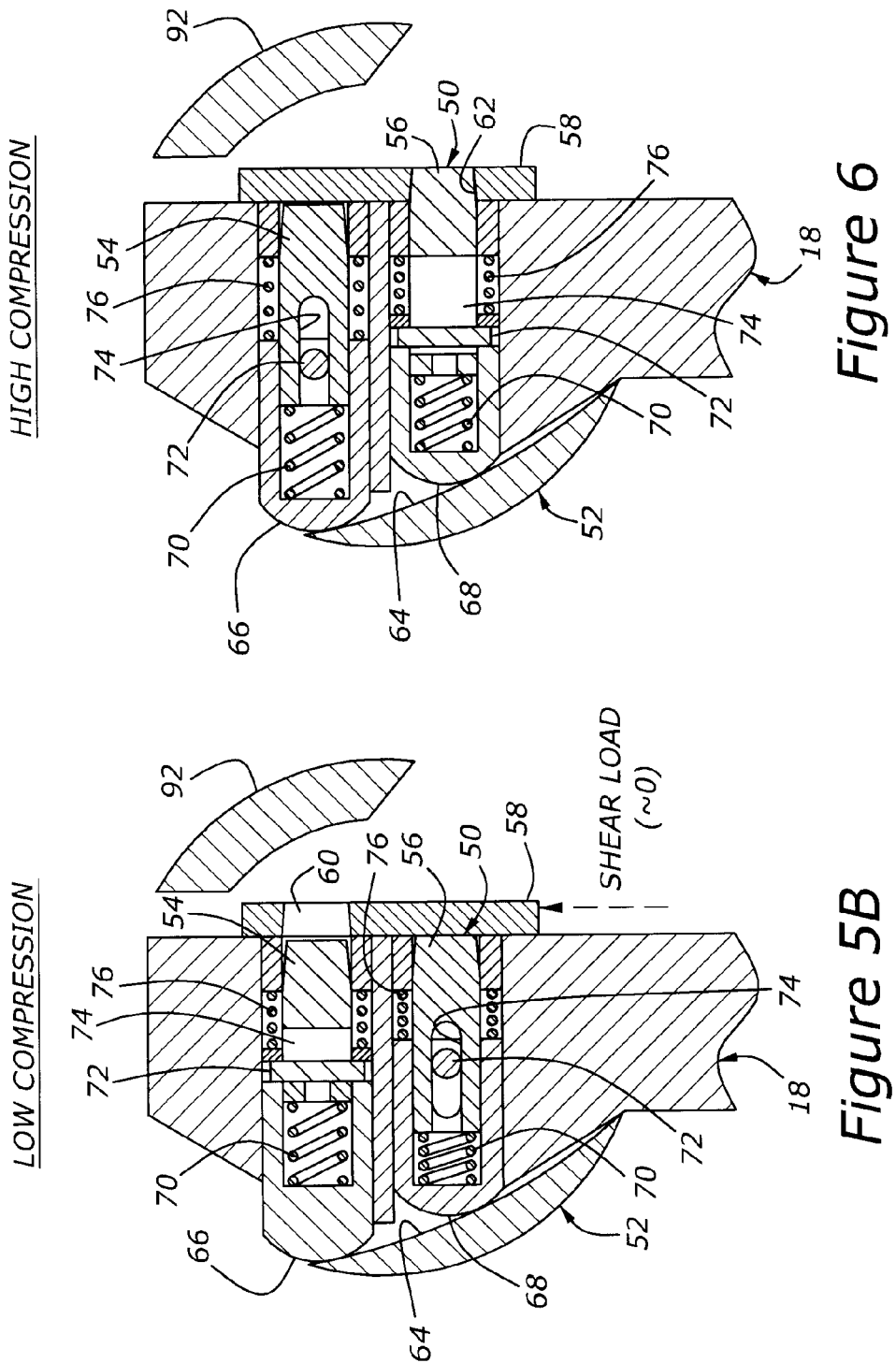

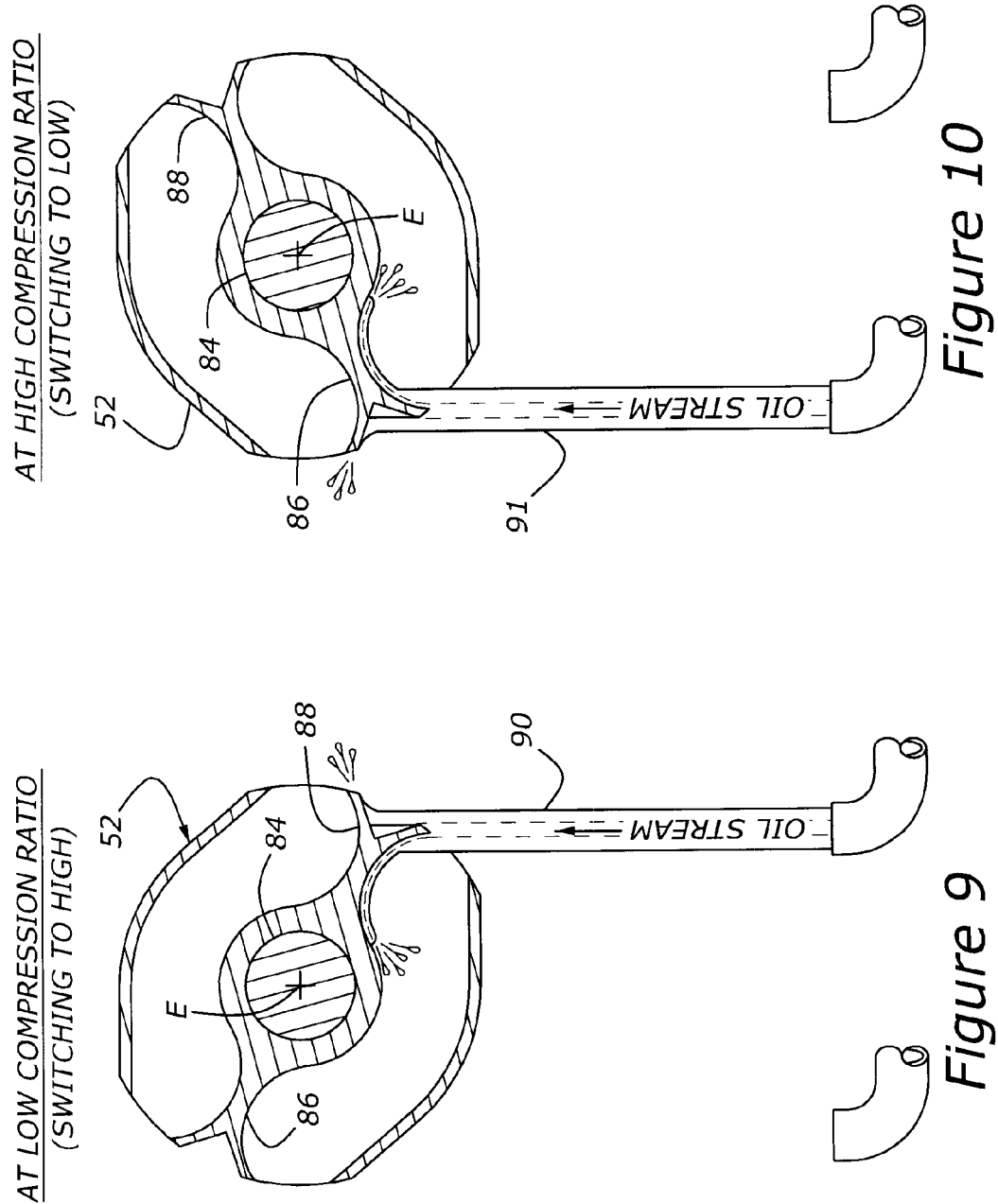

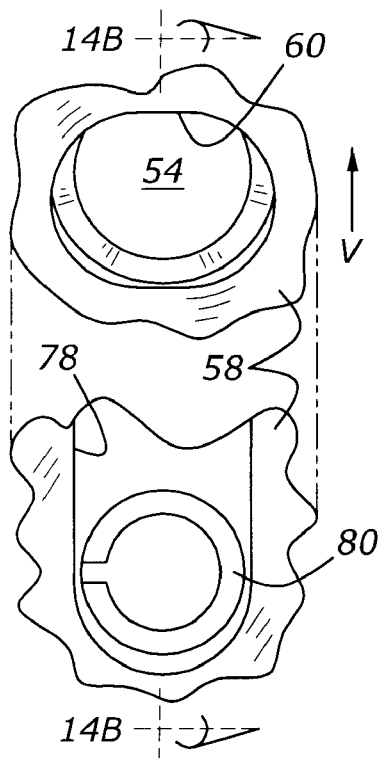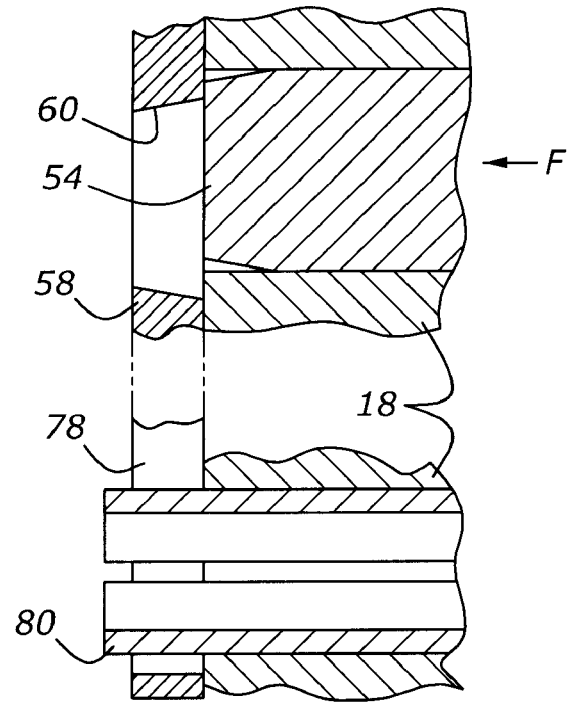
Figure 14A    Figure 14B
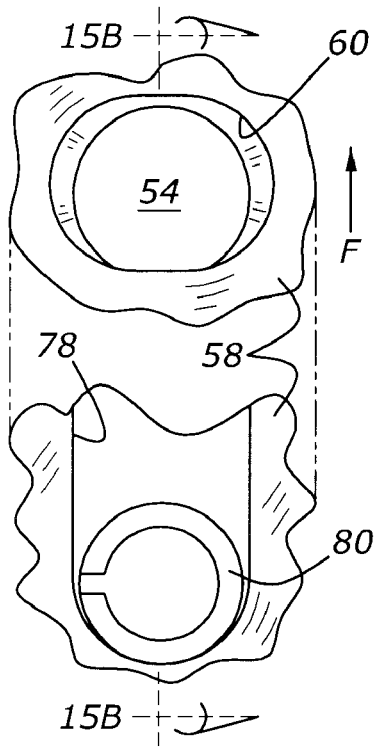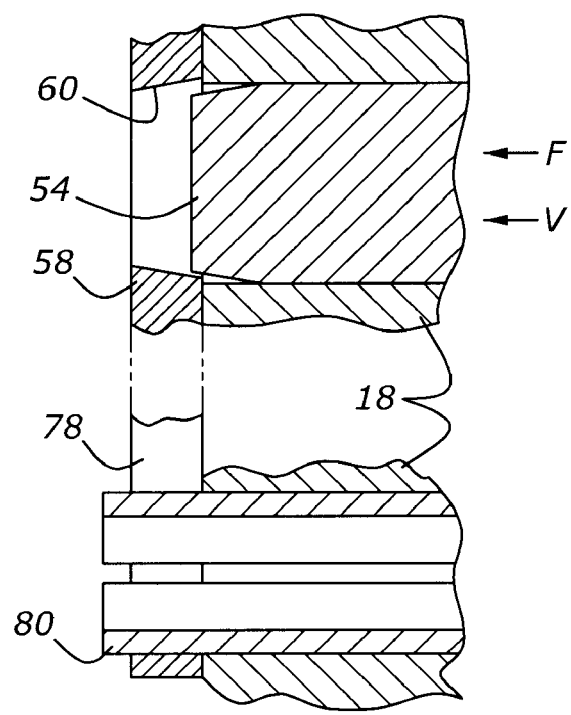
Figure 15A    Figure 15B

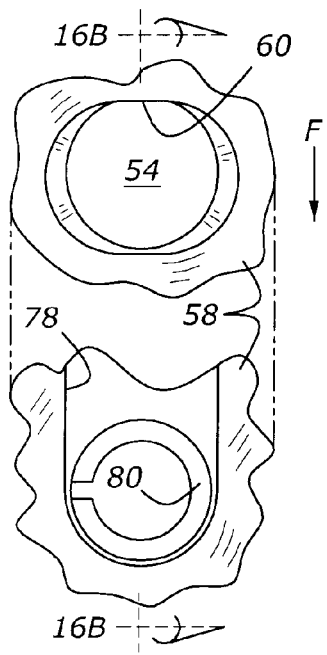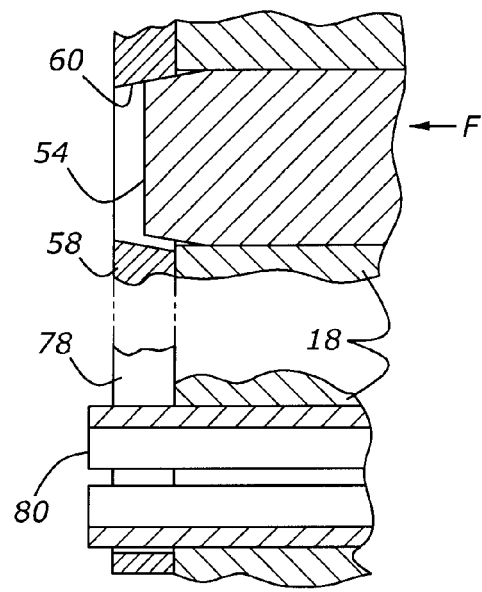
Figure 16A
Figure 16B
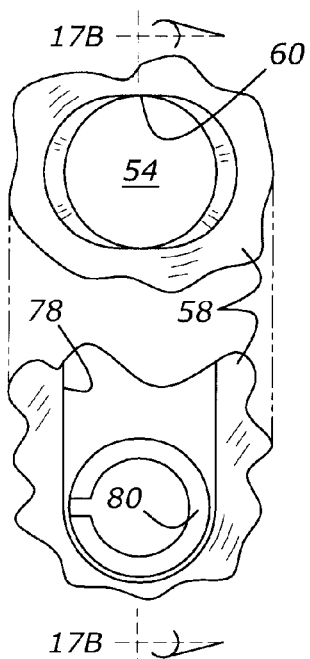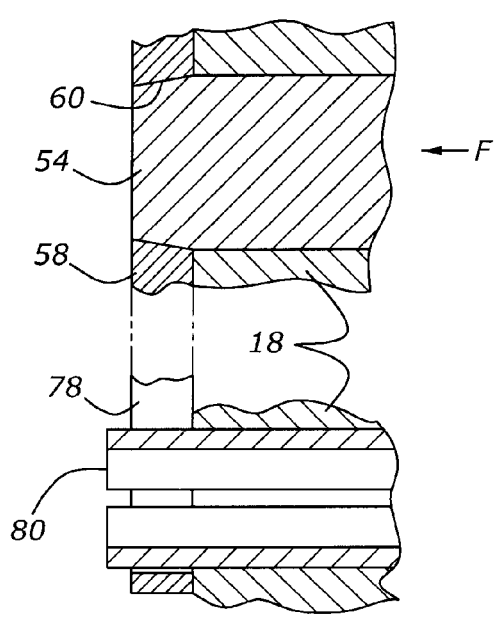
Figure 17A
Figure 17B

VARIABLE COMPRESSION RATIO ENGINE WITH LOST MOTION COUPLING

CROSS REFERENCE TO RELATED APPLICATIONS

None.

BACKGROUND OF THE INVENTION

1. Field of the Invention

The subject invention relates generally to a variable compression ratio engine in which the compression ratio in a cylinder for an internal combustion engine is adjusted while the engine is running, and more specifically toward an improved piston and connecting rod arrangement for dynamically varying the engine compression ratio.

2. Related Art

Gasoline engines have a limit on the maximum pressure that can be developed during the compression stroke. When the fuel/air mixture is subjected to pressure and temperature above a certain limit for a given period of time, it autoignites rather than burns. Maximum combustion efficiency occurs at maximum combustion pressures, but in the absence of compression-induced autoignition that can create undesirable noise and also do mechanical damage to the engine. When higher power outputs are desired for any given speed, more fuel and air must be delivered to the engine. To achieve greater fuel/air delivery, the intake manifold pressure is increased by an additional opening of a throttle plate or by the use of turbochargers or superchargers, which also increase the engine inlet pressures. For engines already operating at peak efficiency/maximum pressure, however, the added inlet pressures created by turbochargers and superchargers would over compress the combustion pressures, thereby resulting in autoignition, often called knock due to the accompanying sound produced. If additional power is desired when the engine is already operating with combustion pressures near the knock limit, the ignition spark timing must be retarded from the point of best efficiency. This ignition timing retard results in a loss of engine operating efficiency and also an increase of combustion heat transferred to the engine. Thus, a dilemma exists: the engine designer must choose one compression ratio for all modes. A high compression ratio will result in optimal fuel efficiency at light load operation, but at high load operation, the ignition spark must be retarded to avoid autoignition. This results in an efficiency reduction at high load, reduced power output, and increased combustion heat transfer to the engine. A lower compression ratio, in turn, results in a loss of engine efficiency during light load operation, which is typically a majority of the operating cycle.

To avoid this undesirable dilemma, the prior art has taught the concept of dynamically reducing an engine compression ratio whenever a turbocharger or supercharger is activated to satisfy temporary needs for massive power increases. Thus, using variable compression ratio technology, the compression ratio of an internal combustion engine can be set at maximum, peak pressures in non-turbo/super charged modes to increase fuel efficiency while the engine is operating under light loads. However, in the occasional instances when high load demands are placed upon the engine, such as during heavy acceleration and hill climbing, the compression ratio can be lowered, on the fly, to accommodate an increase in the inlet pressure caused by activation of a turbocharger or supercharger. In all instances, compression-induced knock is avoided, and maximum engine efficiencies are maintained.

Various attempts to accomplish dynamic variable compression ratios in an internal combustion engine have been proposed. For example, the automobile company SAAB introduced a variable compression ratio engine at the Geneva Motor Show in the year 2000. The SAAB design consisted of a monoblock cylinder head and a separate crankshaft/crankcase assembly. The monoblock head was connected by a pivot to the crankshaft/crankcase assembly, so that a small (e.g., 4°) relative movement was permitted, which movement was controlled by a hydraulic actuator. The SAAB mechanism enabled the distance between the crankshaft center line and the cylinder head to be varied.

Other attempts to accomplish dynamic variable compression ratios have included an effective lengthening/shortening of the connecting rod, which joins the reciprocating piston to a rotating crankshaft. Among the myriad designs which favor adjusting the length of a connecting rod, some are proposed in which an eccentric wristpin connection is provided at the articulating joint between the small end of the connecting rod and the piston. Examples of eccentric wristpin constructions may be found in U.S. Pat. No. 2,427,668 to Gill, issued Sep. 23, 1947, and U.S. Pat. No. 4,687,348 to Naruoka et al., granted Aug. 18, 1987, and also U.S. Pat. No. 4,864,975 to Hasegawa, granted Sep. 12, 1989.

A particular shortcoming in all prior art attempts to extend or shorten the length of the connecting rod arises out of the rapid cyclic compression and tension modes through which a connecting rod is subjected. For example, if it is desired to lengthen the connecting rod, and thus increase the compression ratio at a time when the connecting rod is subjected to high axial compression loads, a great deal of force is required. This leads to complicated and ineffectual mechanisms and designs which are not well suited to today's high efficiency engines and demanding customer expectations. Accordingly, there is a need for an improved variable compression ratio engine which enables adjustment of combustion compression ratios on the fly, and which is not frustrated or counteracted by the extreme cyclical loading that is visited upon a connecting rod during normal engine operations.

SUMMARY OF THE INVENTION

The subject invention overcomes the disadvantages and shortcomings found in the prior art by providing a variable compression ratio piston and rod assembly for an internal combustion engine comprising a piston having a pin set in a pin bore centered along a first axis and a connecting rod having a lower crank end and an upper piston end. The upper piston end of the connecting rod includes a rod bore that is centered along a second axis and is parallel to the first axis of the pin bore. An eccentric bushing pivotally interconnects the piston pin bushing bore and the rod bore for articulating jointed movement of the piston relative to the connecting rod. The eccentric bushing includes a bore that carries the piston pin and an eccentric outer journaled portion carried in the rod bore. The eccentric bushing is rotatable relative to the connecting rod bore so as to effect a spatial displacement between the first axis and the connecting rod lower crank end to effectively alter the compression ratio created by the assembly when it is operatively disposed in an internal combustion engine. An actuator is selectively energizable for producing an actuation impulse. A latch is responsive to that actuation impulse for movement between a latched position in which the eccentric bushing is fixed in one of at least two rotated positions and an unlatched position in which the eccentric bushing is freely moveable relative to the connecting rod. Furthermore, the invention here provides a lost motion coupling that is operatively disposed between the actuator and the latch. The lost motion coupling functionally decouples the actuator from the latch in response to a dominant shearing load between the eccentric bushing and the connecting rod, thus trapping the latch in the latched position. Furthermore, the lost motion coupling automatically re-couples the actuator to the latch when the dominant shearing load falls below a predetermined limit. Whereby, the lost motion coupling enables the actuator to produce an actuation impulse while the latch remains trapped in its latched position without damaging the latch and also automatically energizing a latch for engagement at a later convenient time.

The lost motion coupling feature of this invention utilizes the cyclical nature of the various compression and tension modes through which a connecting rod travels during operation to enable latching and unlatching at opportune moments which are not dependent upon the timing of the actuation impulse. Therefore, the actuator will impose the actuation impulse when the engine calls for a variation in the compression ratio, but the latch will not unlatch until a later, opportune time at which moment the length of the connecting rod, between the crankshaft and the piston, will be automatically changed.

According to another aspect of this invention, a method is provided for varying the compression ratio of the piston and rod assembly in an internal combustion engine. The method comprises the steps of providing a connecting rod having a lower crank end and an upper piston end, providing a piston, and pivotally interconnecting the upper piston end of the connecting rod to the piston with an eccentric bushing. The method further includes selectively rotating the eccentric bushing to spatially displace the piston relative to the connecting rod to effectively alter the compression ratio created by the assembly during crank-driven reciprocating movement within the internal combustion engine. The method also includes the steps of providing a latch that is moveable to a latched position for holding the piston in either of two spatially displaced conditions relative to the connecting rod, and selectively urging the latch to move to an unlatched position in which the piston and the connecting rod are freely extendable relative to each other. The method also includes subjecting the connecting rod to cyclical modes of compression and tension during crank-driven reciprocating movement within the internal combustion engine. The method is characterized by temporarily immobilizing the latch in the latched position during the step of selectively urging the latch to move to the unlatched position until such time as the connecting rod is in transition between the compression and tension modes. Whereby, after the urging step, the latch remains trapped in its latched position but automatically moves to the unlatched position when the connecting rod transitions from compression-to-tension mode or from tension-to-compression mode.

Thus, as described here in this method version of the invention, the latch will not move to its unlatched position until the connecting rod experiences a transition from compression-to-tension or tension-to-compression modes.

BRIEF DESCRIPTION OF THE DRAWINGS

These and other features and advantages of the present invention will become more readily appreciated when considered in connection with the following detailed description and appended drawings, wherein:

FIG. 3 is a fragmentary cross-sectional view of the connecting rod as taken generally along lines 3-3 in FIG. 2, and including superimposed thereover a representative piston shown in cross-section;

FIG. 4 is a cross-sectional view as in FIG. 3, but showing the connecting rod in an extended, high compression configuration wherein a height in the piston is indicated by comparison to FIG. 3;

FIG. 5 is a cross-section through the actuator and latch features as taken generally along lines 5-5 in FIG. 3;

FIG. 5A is a view as in FIG. 5, but depicting an actuation impulse imposed upon the latch while the connecting rod remains in either a high compression or high tension mode;

FIG. 5B is a view as in FIG. 5A, but depicting the automatic re-coupling of the actuator to the latch when the connecting rod transitions from either a compression-to-tension or tension-to-compression mode;

FIG. 6 is a cross-sectional view of the actuator and latch features as taken generally along lines 6-6 of FIG. 4;

FIG. 9 is a simplified view as taken along lines 9-9 in FIG. 3 illustrating the connecting rod at a low compression ratio setting but switching to a high compression ratio mode through the actuation impulse of an oil stream;

FIG. 10 is a view as in FIG. 9 but taken generally along lines 10-10 of FIG. 4 illustrating the connecting rod at a high compression ratio setting but being switched to a low compression ratio setting through the actuation impulse applied through an oil stream;

FIGS. 14A-17B represent a sequence of fragmentary front and companion cross-sectional views showing the tapered bolt and the stop post as they cooperate to ensure successful latching at high speed;

DETAILED DESCRIPTION OF THE PREFERRED EMBODIMENT

Figure 1:
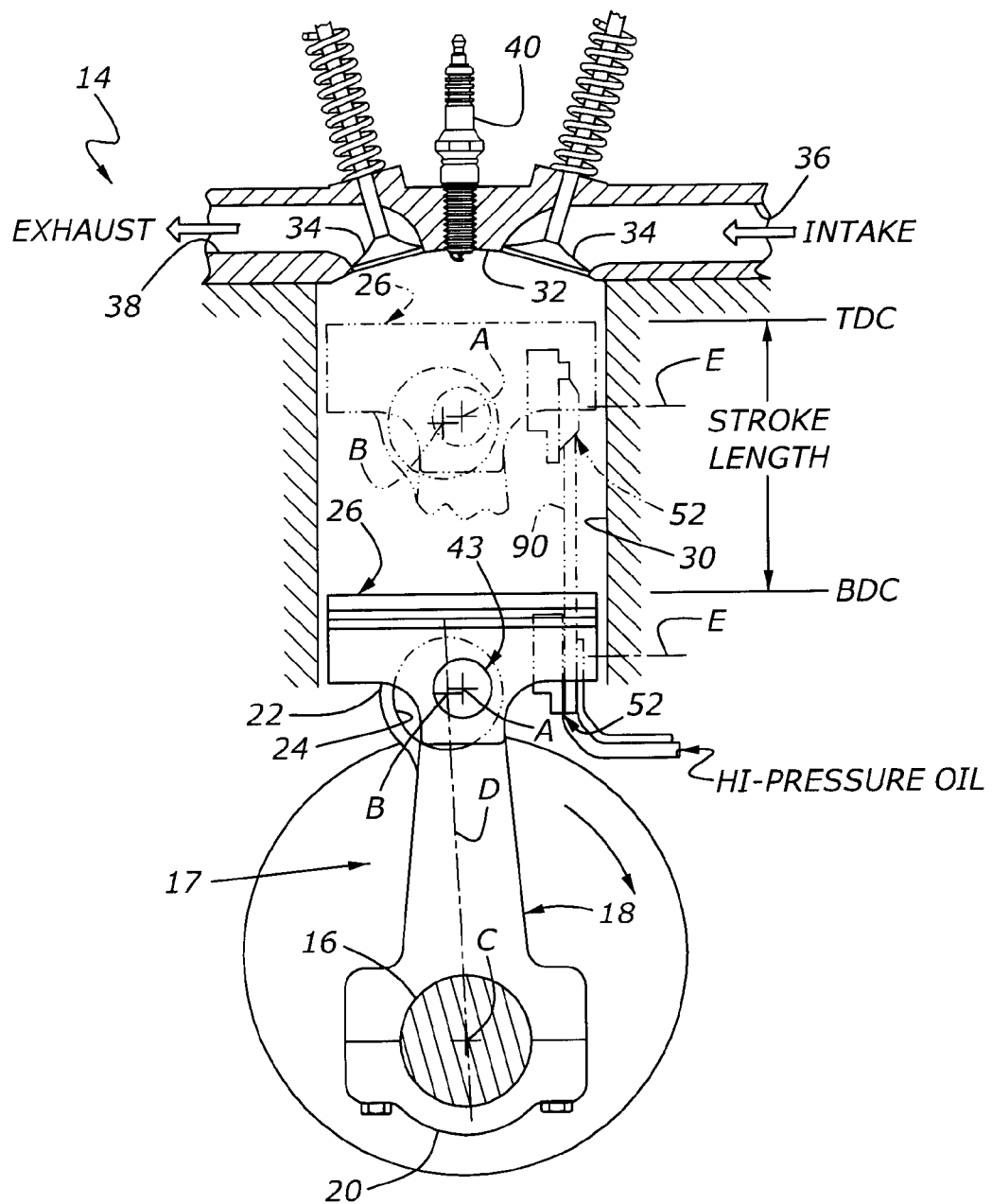
FIG. 1 is a schematic view of a variable compression ratio piston and rod assembly disposed for operation in an internal combustion engine according to the subject invention.

Referring to the Figures, a schematic of a gasoline powered, internal combustion engine is generally shown at 14 in FIG. 1. The engine 14 includes a crank shaft 16 supported for rotation in the typical main bearings (not shown). A connecting rod, generally indicated at 18, has a lower crank end 20 that is rotationally connected to the crank shaft 16, about a crank pin bore axis C. Longitudinally spaced from the crank end 20, the connecting rod 18 includes a piston end 22 supporting a rod bore 24 that is centered along a parallel axis B. A piston, generally indicated at 26, is pivotally connected to the piston end 22 of the connecting rod assembly 17 by a piston pin, generally indicated at 43. The piston pin 43 provides articulating, jointed movement of the piston 26 relative to the connecting rod assembly 17. The piston 26 is guided in a reciprocal stoking direction within a cylinder 30 for movement between Bottom Dead Center (BDC) and Top Dead Center (TDC) limits, the distance between which define the stroke length of the piston and rod assembly. The cylinder 30 is capped by a head 32 in which, in this illustrative example, is provided with overhead valves 34 controlling gas flow through intake 36 and exhaust 38 passages in the well-known manner. A spark plug 40 includes a lower sparking end exposed inside the combustion chamber formed in the space between the piston 26, the head 32 and the cylinder 30 for igniting a compressed mixture of air and fuel according to the well-known principles.

An eccentric bushing 28 is of a type designed to enable dynamic, i.e., on the fly, changes in the compression ratio developed by the piston and connecting rod assembly 17. More specifically, the eccentric bushing 28 has a bore which, in the preferred embodiment is fitted with a piston pin bushing 42, which in turn carries a piston pin 43. The piston pin 43 interconnects the piston pin bushing 42 to the pin bore 44 of the piston 26. Typically, the pin bore 44 is formed in integral piston pin bosses 46 of the piston 26, although other arrangements have been proposed. The pin bore 44 in the piston 26 is centered along a first axis A that is parallel at all times to both the crank pin bore axis C and the second axis B of the rod bore 24. The eccentric bushing 28 further includes an eccentric outer journaled portion 48 carried in the rod bore 24. The eccentric outer journaled portion 48 is offset from piston pin bushing 42 and the piston pin 43 so that when the eccentric bushing 28 is rotated about its journaled portion 48, a spatial displacement is registered between the C and A axes. This phenomenon is perhaps best illustrated by reference to FIGS. 3, 4 and 20 where it is shown that, as a result of rotating the eccentric bushing 28 relative to the connecting rod 18 approximately 32°, as an example, the height of the piston 26 is altered by a few millimeters. It being understood that the specific angular displacement is something of a design criteria that may change from one implementation to the next.

The change in the piston height, relative to the crank pin bore axis C, effectively alters the compression ratio that is created by this piston and rod assembly when it is operatively disposed in an internal combustion engine 14. In other words, at Top Dead Center (TDC), the space between the crown of the piston 26 and the cylinder head 32 is varied by carefully articulating the eccentric bushing 28. Naturally, a smaller volume at TDC translates to an increased compression ratio, whereas a larger volume at TDC results in a lower compression ratio when the swept volume remains constant. Thus, by simply rotating the eccentric bushing 28 relative to the connecting rod 18, while the engine is running, a variation in the compression ratio can be used to achieve the advantages and performance improvements attributed to variable compression ratio engines.

Figure 13:
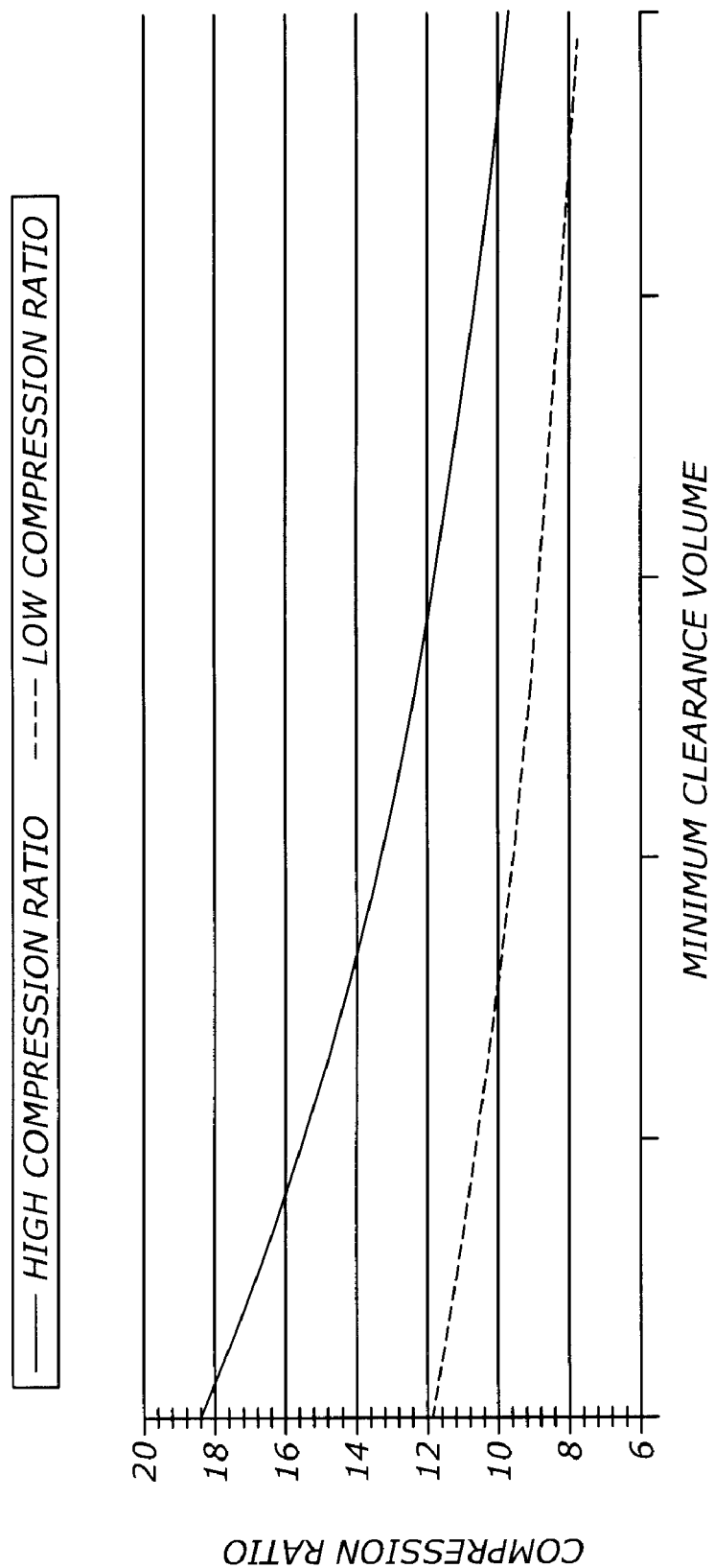
FIG. 13 is a graph contrasting compression ratios versus minimum clearance volume in an engine operating under high compression and low compression conditions.

As an example of this compression shift feature, FIG. 13 presents the changes that would occur with a suggested 3 mm lengthening of the connecting rod assembly 17, assuming a stroke length of 86.7 mm in a standard 3.5 L V6 engine.

A connecting rod center line D is defined as an imaginary line extending longitudinally between the crank pin bore axis C and the second axis B of the rod bore 24. From reference to FIGS. 3 and 4, together with reference to FIG. 1, it will be noted that the first axis A of the pin bore 44 is laterally offset from the rod center line D at all times. In other words, in the preferred configuration of this invention, at no time during rotation of the eccentric bushing 28 relative to the connecting rod 18 is the first axis A permitted to coincide with or cross the connecting rod center line D. This condition is preferred so that the torsional moments can be used to greatest advantage in shifting the length of the connecting rod assembly 17 between its low compression and high compression settings, as will be described in greater detail below. Although it is acknowledged that the novel features of this invention could be reconfigured with a system which does permit the first axis A to cross the rod center line D during transit between high and low compression ratio settings. Nevertheless, in the preferred embodiment, the lateral distance, i.e., measured perpendicular to the connecting rod center line D, between the first axis A and the second axis B must be sufficient so that the design-specified piston height adjustment can be accomplished over a fairly narrow, i.e., less than 180 degrees, range of angle adjustment. This aspect of the invention is described in greater detail below in connection with FIGS. 20 and 21.

A latch 50 is provided for securely holding the eccentric bushing 28 in either of its low or high compression adjusted positions, until acted upon by an actuation impulse signaling a desired change to the other setting. In a broadly defined manner, the latch 50 is responsive to an actuation impulse for movement between an unlatched position, in which the eccentric bushing 28 is freely rotatable relative to the connecting rod 18, and a latched position in which the eccentric bushing 28 and the first connecting rod 18 are fixed in either of two arcuately spaced positions (i.e., either FIG. 3 or FIG. 4). The latch 50 is shown in its unlatched position in FIG. 5B, and in its latched position in FIGS. 5, 5A and 6. An actuator, generally indicated at 52, provides the necessary actuation impulse. The actuator 52 is also carried on the upper end 22 of the connecting rod 18 and can be selectively energized at the moment of demand, such as determined by computation carried out in an electronic control module, or by slavish response to a predetermined condition such as starter motor activation or turbo/super charger activation or deactivation. In other words, a specific event or a specific condition may be used to selectively energize the actuator 52, upon which the actuation impulse is produced to move the latch 50 from its latched to its unlatched position, and vice versa.

Figure 2:
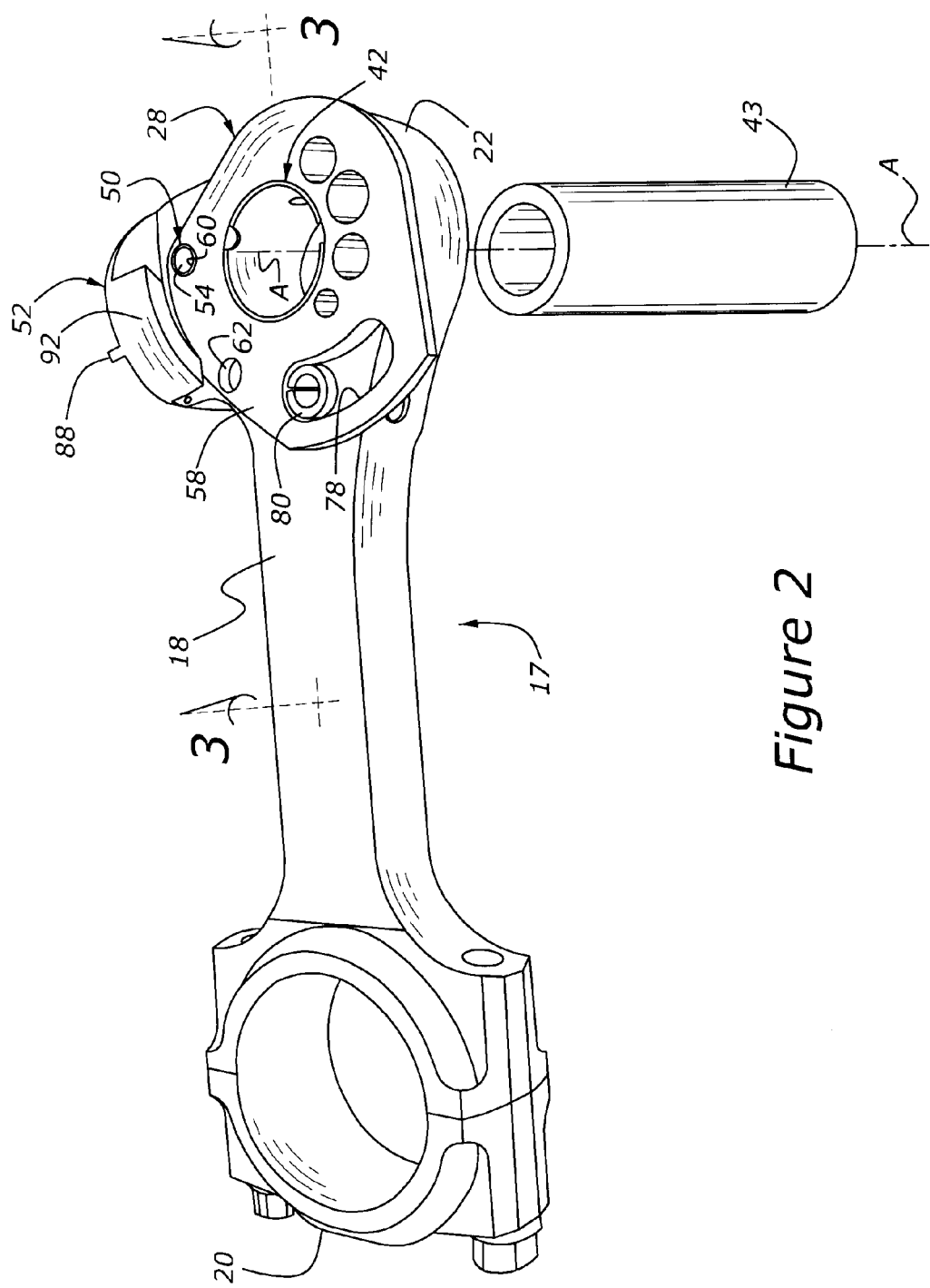
FIG. 2 is a perspective view of a connecting rod assembly according to the subject invention.
Figure 7:
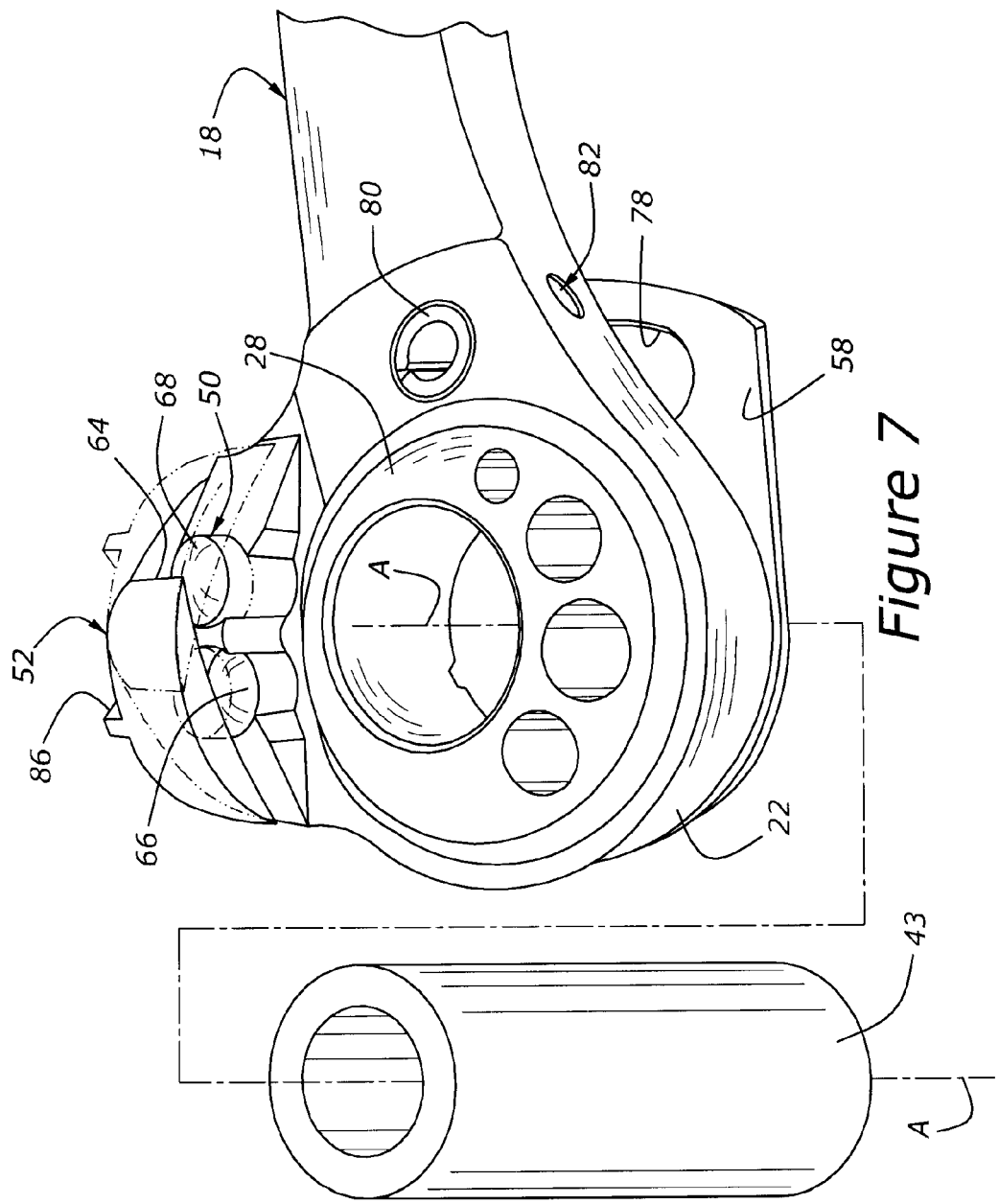
FIG. 7 is a perspective view of the upper piston end of a connecting rod according to the subject invention, with the actuator shown in a displaced condition in phantom.

Considering more specifically the construction of the latch 50 mechanism, one exemplary embodiment suitable for carrying out the purpose of this invention is depicted in the accompanying drawings. Although, those of skill in the art will appreciate various alternative constructions and arrangements of components with which to formulate a latch which behaves in the manner and spirit captured in the claims of this invention. Referring to FIGS. 2 and 5-6, the latch 50 is shown including an upper bolt 54 for fixing the eccentric bushing 28 in a first one of at least two arcuately spaced positions, and a lower bolt 56 (spaced from the upper bolt 54) for fixing the eccentric bushing 28 in a second one of the at least two arcuately spaced positions. In this example, the eccentric bushing 28 includes a flange plate 58 having two holes 60, 62 therein for receiving the respective upper 54 and lower 56 bolts. The bolts 54, 56 are carried for axial sliding movement in the piston end 22 of the connecting rod 18. When displaced by the actuator 52, at appropriate times, the bolts 54, 56 find alternating registry within their respective holes 60, 62 formed in the flange plate 58, thereby fixing the eccentric bushing 28 solidly with respect to the connecting rod 18.

The upper hole 60 is used to lock the angle adjusted condition of the eccentric bushing 28 when the assembly is configured in its low compression mode depicted in FIG. 3. The upper bolt 54 is shown in registry with its companion hole 60 in FIGS. 5 and 5A which, according to the legends, indicate the low compression ratio or shortened connecting rod assembly 17 configuration. However, when the latch 50 is appropriately manipulated so that the lower bolt 56 is in registry with its companion hole 62, as shown in FIG. 6, the eccentric bushing 28 is angle adjusted to its high compression ratio orientation, as illustrated in FIG. 4. Thus, somewhat like a dead bolt operating as part of a lock set in a door, when either of the upper 54 or lower 56 bolts are thrown so as to find mating registry with their respective holes 60, 62 in the flange plate 58, the members become locked relative to the connecting rod 18.

A lost motion coupling is operatively disposed between the actuator 52 and the upper 54 and lower 56 bolts so as to functionally decouple the actuator 52 from the latch 50 in response to a dominant shearing load between the flange plate 58 and the connecting rod 18. Referring again to FIG. 5, the latch 50 is shown here fully seated in its low compression ratio orientation, such as would be expected when operating in a turbo charged or super charged mode. Once the demand for high power has subsided, it is desirable to deactivate the turbo/super charger and return the engine 14 to a more economical, high compression ratio setting. In this manner, the actuator 52 is energized to provide an actuation impulse which, in the example of FIG. 5A, represents rotation of a cam 64 in a counterclockwise arc of about 60 degrees. However, it should be noted that, although the actuator 52 has been energized, i.e., rotated, the upper bolt 54 remains in full, locking registry with its companion hole 60 in the flange plate 58, thereby signifying that eccentric bushing 28 remains locked in the low compression ratio condition. Thus, although the command has been dispatched for a change to the high compression configuration, the latch 50 remains in its latched condition, trapped by a dominant shearing load which exists between the flange plate 58 and the piston end 22 of the connecting rod 18. This dominant shearing load is created because of compression or tension forces in the connecting rod assembly 17 acting upon the eccentric bushing 28 through the piston pin 43, which is laterally offset (relative to the connecting rod center line D) from the connecting rod small end bore 24.

Figure 12:
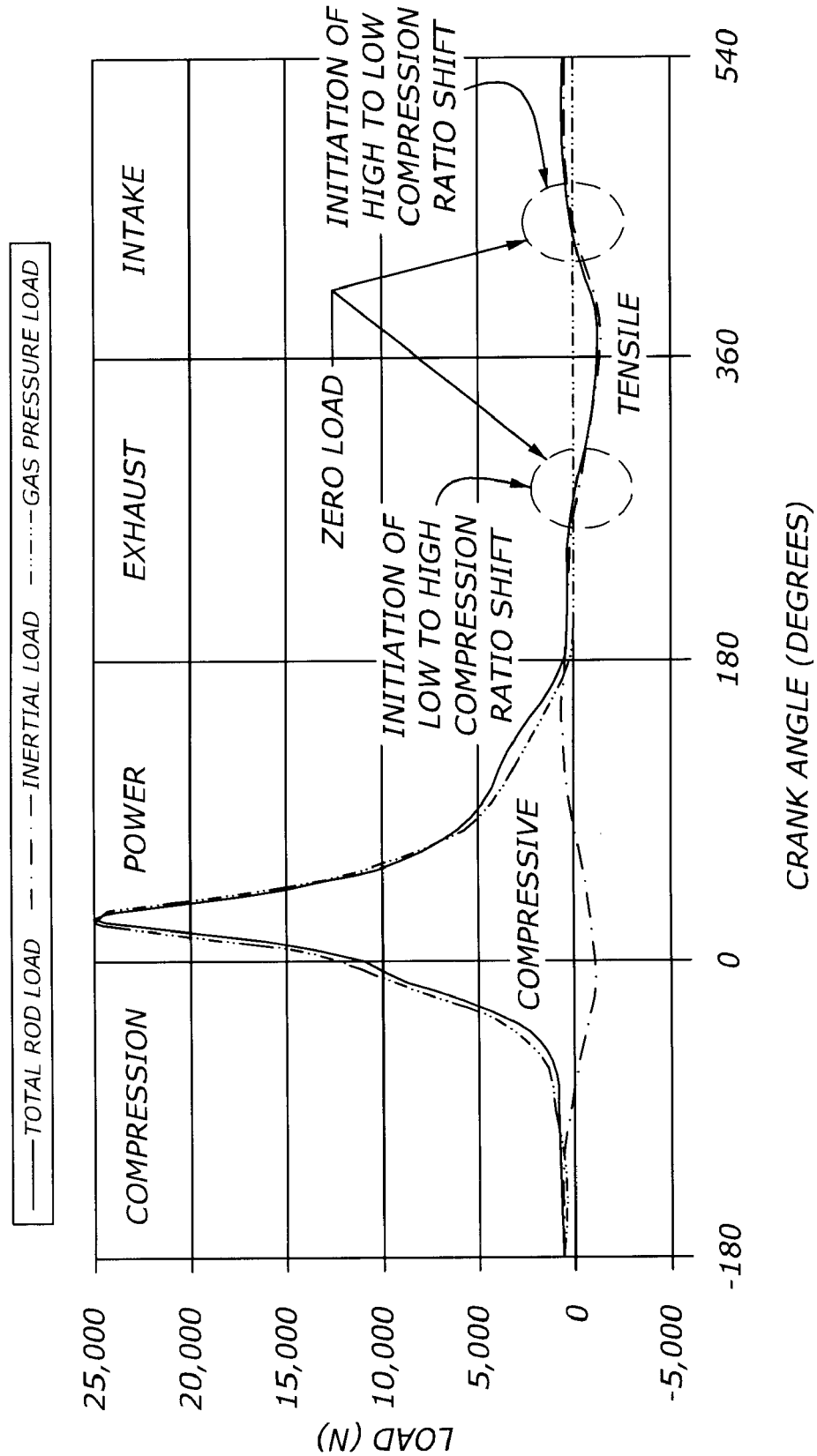
FIG. 12 is a graph depicting the four cycles or strokes of a typical gasoline internal combustion engine and illustrating the cyclical compression and tension modes through which the connecting rod is subjected.

FIG. 12 is a graph showing the typical axial loading (in Newtons) experienced by the connecting rod 18 as measured along its center line D. As the assembly is moved through its compression and power strokes, high compressive loading is experienced due to combustion gases that are first compressed and then expanded. However, a transition occurs approximately midway through the exhaust cycle, in which the axial loading experienced by the connecting rod 18 becomes tensile loading due predominantly to the inertial loads resulting from a rapid deceleration of the piston 26. The axial loading again transitions back to compression loading midway through the intake cycle. The transition zones at which loading along the connecting rod center line D are zero have been indicated in FIG. 12 by circumscribing broken lines with legends indicating the points at which the length of a connecting rod 18 may be changed from either low-to-high compression ratio or else from high-to-low compression ratio. Thus, FIG. 5A would represent a dominant shearing load, either compression or tension, upon the connecting rod 18, along its center line D, which acts through the eccentric bushing 28 to effectively trap or pinch the upper bolt 54 in its companion hole 60.

FIG. 5B, however, represents the point in time at which the shear load, or more appropriately perhaps the loading on the connecting rod 18 as depicted in FIG. 12, moves through the transition zones and through a zero load moment. It is at this moment that the lost motion coupling automatically re-couples the actuator 52 to the latch 50 so that it indeed moves to its unlatched position enabling free relative movement between the eccentric bushing 28 and the connecting rod 18. Furthermore, as shown in FIG. 6, the lower bolt 56 is simultaneously urged to drop into its companion hole 62, thereby locking the assembly in the high compression, length adjusted state depicted in FIG. 4.

The lost motion coupling enables the actuator 52 to produce its actuation impulse while the latch 50 remains trapped in its latched position but without damaging the latch 50. The lost motion coupling also automatically moves the latch 50 at a later, convenient time but prior to a change in the piston 26 height relative to the connecting rod 18. In other words, and referring specifically to FIG. 12, the actuator 52 may be actuated at any time throughout 720 degrees of crank angle movement, i.e., through all four strokes of one complete cycle in an internal combustion engine 14. However, it is only convenient or desirable to initiate a height change (i.e., a compression ratio adjustment) during one of the transition zones wherein the loading along the connecting rod center line D is at or nearly zero. Thus, the lost motion coupling in essence defers a command for the latch 50 to move to an unlatched condition until such time as the shear loading between the flange plate 58 and the connecting rod 18 very nearly approaches zero.

Although the lost motion coupling may take many different forms, the one exemplary embodiment depicted here is best shown in FIGS. 5-7 and 11. The lost motion coupling is, in these examples, shown to include an upper follower 66 telescopically affixed to the upper bolt 54, and a lower follower 68 telescopically affixed to the lower bolt 56. The actuator cam 64 rides against, and selectively displaces, the upper 66 and lower 68 followers. An inner biasing member 70, e.g., compression spring, is operatively disposed between each bolt 54, 56 and follower 66, 68 to continuously urge the two members apart. A small pin 72 is carried by the follower 66, 68, trapped in a slot 74 formed in the bolts 54, 56, to limit travel and capture the biasing member 70 in its operative position. An outer biasing member 76 acts between each follower 66, 68 and the connecting rod 18 to continually urge each follower 66, 68, together with its associated bolt 54, 56 toward an unlatched (retracted) condition. The axial travel of the upper 66 and lower 68 followers, and the resulting strain energy transferred to the biasing members 70 and 76, is configured in a manner that makes the rotary position of actuator 52 stable at both ends of its travel and unstable in all intermediate positions. Thus the rotation of the actuator 52 will perform in a manner similar to the toggle lever on an electrical light switch. This is accomplished by properly configuring the surface of the actuator cam 64. As an example, if the actuator 52 were to be rotated slightly clockwise from the position illustrated in FIG. 5A, the actuator cam would displace the lower follower 68 slightly to the right before it would allow the follower to travel to the left as shown in FIG. 5. This slight travel to the right increases the strain energy within the biasing members 70 and 76, and thus would require an exertion of torque to produce the slight rotation from its end position. When the other follower reestablishes contact with the cam 64, as illustrated in FIG. 5B, the rotational stability of actuator 52 further increases. Stability of actuator 52 is very important to assure that a small inertial unbalance of actuator 52, or other small manufacturing variation will not cause spontaneous rotation of the actuator when it is exposed to the acceleration forces present during normal engine operation. In the configuration shown, the upper and lower bolts are free to rotate within their respective bores, and the components are configured to allow proper function of the latches at any rotary position of the bolts within their bores. I.e., the tapered ends of the bolts 54, 56 are conical in shape, and the surfaces of the followers 66, 68 that contact the cam 64 are spherical in shape. If the latches were designed to be constrained against rotation within their bores, there would be an opportunity to reduce contact stresses by configuring the cam contacting surfaces of the followers 66, 68 with cylindrical shape, and by configuring the tapered ends of the bolts 54, 56 with tapered flats.

Figure 23:
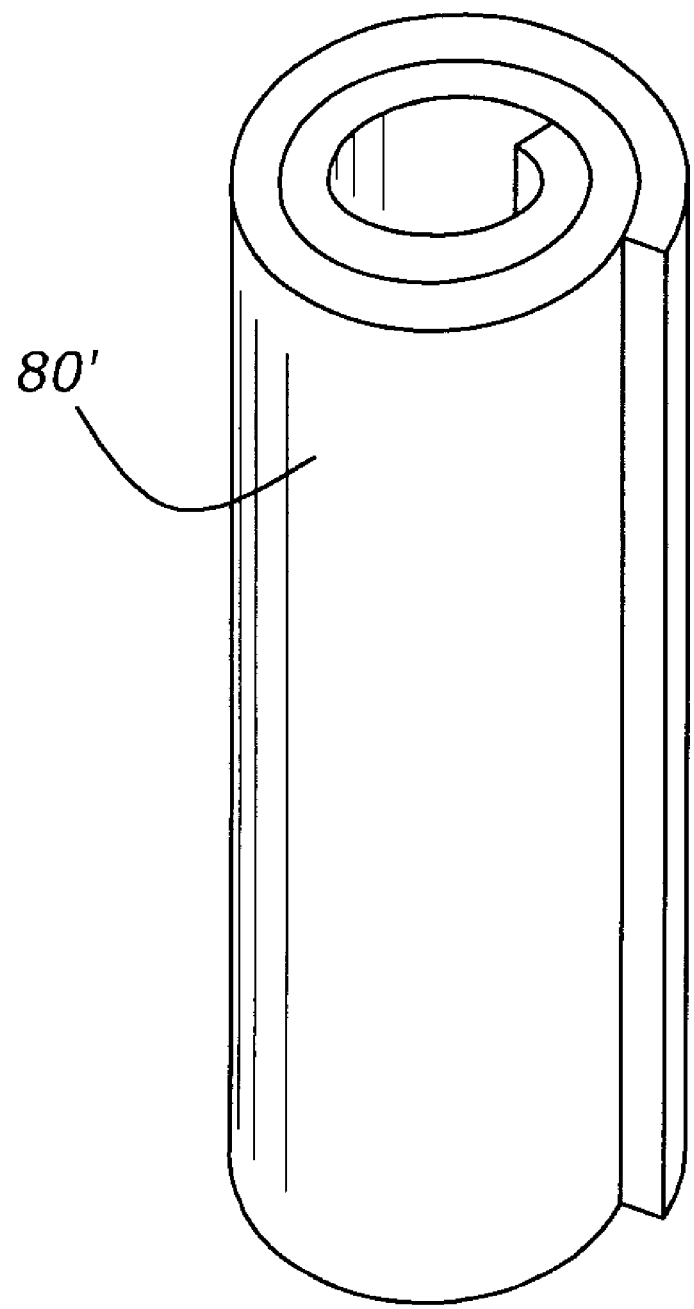
FIG. 23 is a perspective view of an alternative stop post of the coiled pin type.

As perhaps best shown in FIGS. 2-4, the flange plate 58 of the eccentric bushing 28 is provided with an arcuate slot 78, which arc is centered relative to the second axis B. The arcuate slot 78 overlies a portion of the connecting rod 18 and operatively registers with a stop post 80 extending therefrom. In other words, the stop post 80 extends from the side of the connecting rod 18 and is trapped within the arcuate slot 78. Rotational travel of the flange plate 58 is effectively limited by the length of the arcuate slot 78 as it abuts either side of the stop post 80. Thus, rotational travel of the eccentric bushing 28 relative to the connecting rod 18 can be controlled by this arcuate slot 78 and stop post 80 arrangement. The limits of the arcuate slot 78 are keyed to the position of the holes 60, 62 relative to their respective upper 54 and lower 56 bolts, allowing slightly greater rotation of the eccentric bushing 28 than what is needed for registry of the bolts 54, 56 to their respective holes 66, 68. The stop post 80 can have some elastic and damping properties so that when a compression ratio switch is done at high engine speed and the eccentric bushing 28 switches (i.e., rotates) at high speed, the stop post 80 can absorb and at least partially dampen the impact at the end of travel, and the bolt 54 or 56 can engage to lock the flange plate 58 as it rebounds off the stop post 80 with reduced velocity. The stop post 80 is depicted here as a roll pin, although alternative embodiments are possible, including a spiral coiled pin with inherent elastic and damping properties as illustrated in FIG. 23. A set screw 82 can be used to keep the elastic stop pin 80 from moving out of its proper position.

FIGS. 14A-17B show how the resilient bumper (stop post 80) and tapered tip of the bolts 54, 56 coordinate to catch and lock the eccentric bushing 28 when it is shifted at high engine speed. These Figures represent a sequence of fragmentary front and companion cross-sectional views. In FIGS. 14A and 14B, the flange plate 58 of the eccentric bushing 28 is shown moving upward relative to the connecting rod 18 and the stop post 80 and the tapered tip of the bolt 54. There is a spring force (F) generated by inner biasing element 70 pushing the bolt 54 toward the flange 58. Until the hole 60 in the flange 58 moves far enough upward, however, the bolt 54 cannot move.

FIGS. 15A and 15B represent a further progression of movement when the arcuate slot 78 in the flange plate 58 impacts the stop post 80. The bolt 54 is then cleared to move inward toward its hole 60. Because of the tapered interface, the bolt 54 can begin moving into registry with its hole 60, even though the hole 60 has moved too far upwardly (as viewed from the perspective of this drawing).

Continuing in this sequential progression, FIGS. 16A and 16B show the flange 58 having rebounded off of the stop post 80, with an expected reduction of velocity (flange plate 58 relative to bolt 54) because of the damping properties of the stop post 80. At this stage, the hole 60 gets caught on the top side of the tapered bolt tip, which is at least partially engaged into the depth of the hole 60 because of the spring force (F) acting on the bolt 54 over the time that the flange plate 58 has been impacting and rebounding off of the stop post 80. Provided the latch 50 components are manufactured to satisfactory standards and tolerances, the partial engagement is adequate to hold the flange plate 58 for the next combustion cycle of the engine. When next the shearing load of the flange plate 58 reverses toward an upward direction again, the spring force (F) acting on the bolt 54 will drive the tapered tip fully into its mating tapered hole 60, as shown in FIGS. 17A and 17B.

Thus, as can be observed by reference to FIGS. 14A-17B, the stop post 80, which is provided as an element separate and distinct from the latch 50, is beneficial to arrest movement of the eccentric bushing 28 during its rotation (i.e., switching) from one rotated position to the other so as to isolate the latch 50 from stresses arising out of inertial impact with the flange plate 58 as the piston 26 moves between its spatially displaced positions.

With reference again to FIG. 12, when a variation in the compression ratio is called for by the actuation impulse operating through the actuator 52, the latch 50 remains in its latched position until the load along the connecting rod center line D approaches or reaches zero at one of the indicated transition zones. Whichever one of these zones is first encountered in the engine's cycle, the respective bolt 54, 56 will be automatically withdrawn from registry in its companion hole 60, 62. As stated above, this is depicted in FIG. 5B for the example of moving from low compression to high compression ratio settings.

Thus, in the example of FIG. 5 where an engine is operating at its low compression ratio setting, a call for return to the high compression ratio mode will be indicated by an actuation impulse such as rotation of the actuator 52 and cam 64 to the position shown in FIG. 5A. However, if for example this call for change from low compression to high compression ratio occurs at the 360 degree crank angle point, i.e., Top Dead Center between exhaust and intake strokes, the connecting rod 18 will be in tensile mode. At the moment it enters the next transition zone somewhere around 440 degrees, the connecting rod 18 will move into a compression mode. The desired compression ratio change in this example is from low compression to high compression ratio, which means that the connecting rod 18 must effectively lengthen. However, a compressive load is now exerted on the connecting rod 18 and will remain until the next transition zone is reached somewhere around 280 degrees crank angle. In this situation, the assembly will remain in the unlatched condition of FIG. 5B throughout the remainder of the intake stroke and through the entirety of the compression and power strokes, only moving to the condition of FIG. 6 when the next transition zone is reached at around 280 degrees. During this mode, when the latch 50 is completely unlatched from the flange plate 58, interaction between the arcuate slot 78 and the stop post 80 bear the full brunt of shear load resistance to hold the eccentric bushing 28 in the low compression ratio condition. A similar scenario would occur when moving from high compression to low compression ratio but the time lag between unlatching and re-latching in the new position is relatively short as indicated by the close spacing of the transition zones in the exhaust and intake strokes of the cycle.

Figure 8:
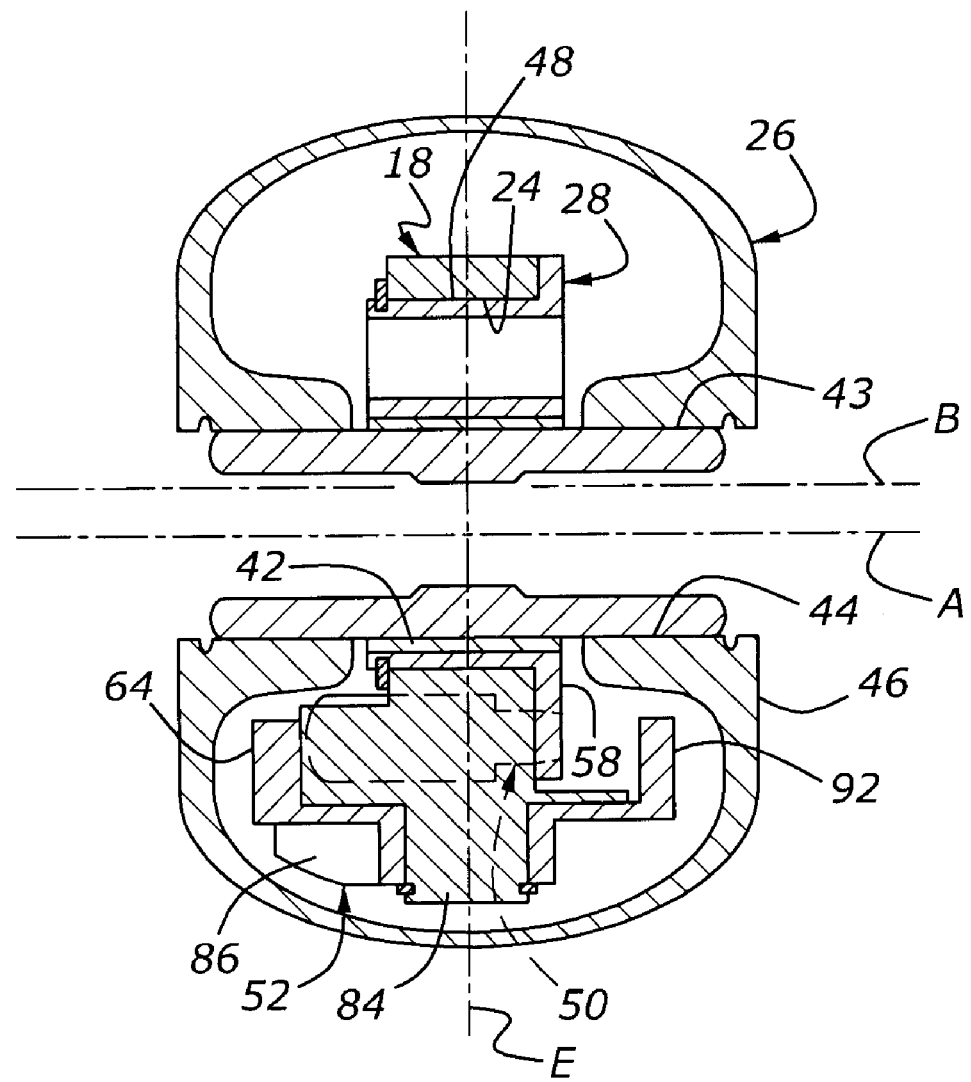
FIG. 8 is a cross-sectional view of the actuator and latch features taken generally along lines 8-8 in FIG. 4.
Figure 11:
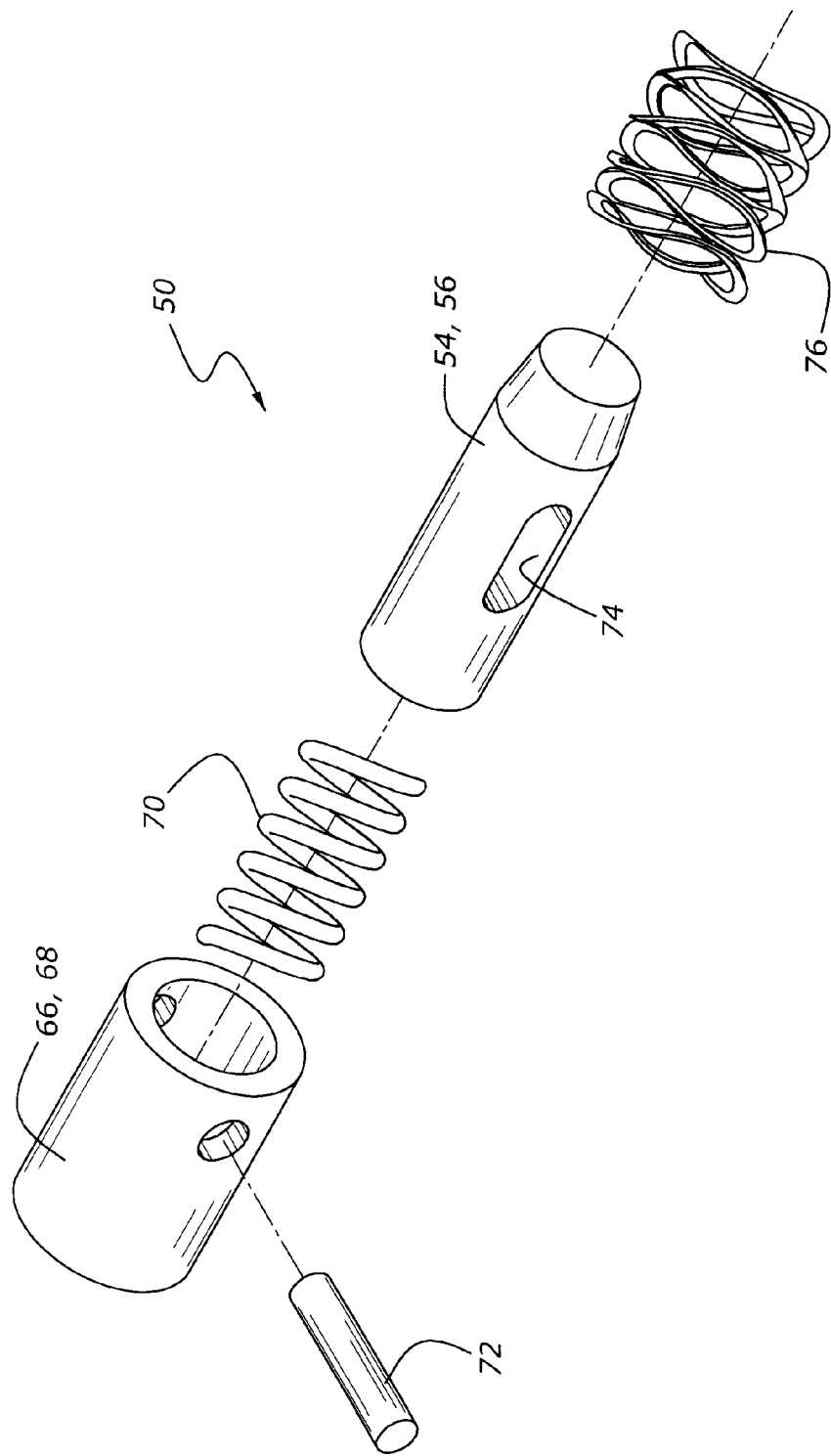
FIG. 11 is an exploded view of a latch according to the subject invention.

In FIGS. 8-10, the actuator 52 according to this exemplary embodiment of the invention is described in greater detail. The cam 64 is controlled by actuator 52 that is rotatably carried on a boss 84 extending from the piston end 22 of the connecting rod 18. The boss 84 forms a stub shaft establishing a rotational axis E that is orthogonally oriented to the first A and second B axes, and preferably intersects axis B. The cam wheel 82, again in this exemplary embodiment, carries a pair of paddles 86, 88 which are responsive to pressurized jets or streams of oil 90 and 91 as schematically depicted in FIG. 1. When a force transmitter, such as an oil stream 91, acts upon the paddle 86, the actuator 82 is rotated to the position shown in FIG. 9 which ultimately results in the connecting rod assembly 17 being oriented into its low compression ratio setting. This is illustrated in FIG. 9. When it is desired to switch to a high compression ratio setting, another oil stream 90 is directed onto the paddle 88 forcing a counterclockwise rotation to the condition illustrated in FIG. 10. Thus, FIG. 10 represents the orientation of the actuator 52 in a high compression ratio setting. When it is desired to switch to low compression ratio, an oil stream 91 is directed at the paddle 86 as illustrated in FIG. 10, which will rotate the actuator 52 in a clockwise fashion back to the orientation of FIG. 9. This back and forth movement of the actuator 52 resulting from jet streams of oil 90, 91 acting on either of the paddles 86, 88, causes the cam 64 to move between the positions illustrated in FIGS. 5 and 6. As shown in those figures, a counterweight 92 may be carried by the actuator 52, opposite the cam 64, as a balancing technique.

In order to maximize the force transfer between oil streams 90, 91 and the paddles 86, 88, it may be desirable to shape the tip of each paddle 86, 88 with a cup feature. Although other design shapes and features are possible, the shape depicted in FIGS. 9 and 10 would enhance the thrust from the oil streams 90, 91 compared with straight, unshaped paddle forms.

Although an oil stream 90 is presented as the preferred force transmitting technique to act upon the actuator 52 because it is readily available, quiet, without impact noise, and can transfer force to the actuator throughout most of the rotary position of the crankshaft, it is contemplated that other techniques and devices may be substituted. As but one example, a solenoid or other servo mechanism external to the connecting rod 18 might be used to position a mechanical member to make contact with a paddle 86 or 88 near the bottom of the piston 26 travel within its cylinder 30. Because of the possible noise of impact, it may be desired to do this manner of compression ratio switching only during the period of low speed cranking encountered at engine startup. As one possible scenario, during the initiation of the engine startup sequence, a sensor in the vehicle's fuel tank could determine ethanol content of the fuel, and a fuel octane rating could be estimated. Upon cranking of the engine, the appropriate servos would be actuated to switch the engine to high compression ratio for high ethanol fuel, or low compression ratio for low ethanol fuel content. Other concepts may also be embraced.

Regardless of whether a jet of oil 90, 91 or solenoid armature, or other mechanical, electromechanical, or hydro-mechanical device is chosen as the force transmitter for transmitting an energizing force to the actuator 52, the preferred embodiment of force transmitter is mechanically isolated from the acceleration fields of the connecting rod 18 such that inertial forces generated by the connecting rod 18 do not influence the force transmitter. As will be appreciated by those skilled in the art, the connecting rod 18 generates inertial forces when accelerated during cyclic operation in an internal combustion engine 14. All prior art connecting rods that adjust length through an eccentric bushing rely on hydraulic columns of oil piped through the connecting rod. Oil contained inside the connecting rod is directly affected by connecting rod accelerations. Actuation forces transmitted through medium of hydraulic oil are decreased when the connecting rod is accelerated in the opposite direction and substantially increased when accelerated in the same direction. Included gas bubbles in the hydraulic oil thus may create unpredictable reactions, especially if multiple columns of oil are being actuated in timed sequences to move various interrelated latching elements. For example, in a hypothetical prior art engine with 100 mm stroke and a 150 mm long column of oil in the connecting rod, at 6000 RPM the 1st order acceleration on that column of oil at TDC and BDC calculates to 19,739 m/s$^2$. Assuming the oil in that column has a density of 0.9 g/cm$^3$, the pressure difference from one end of the oil column to the other end would be 386 psi. If the prior art employs two columns of oil and are relying on a differential in pressure at the small (piston) end of the connecting rod to actuate a latch mechanism, but the two columns have different masses due to a difference of oil aeration, or the presence of a metal locking pin in one of the columns, extremely large pressure differentials will be needed at the large (crank) end of the connecting rod to achieve reliable function of the latch mechanism.

However, a particular advantage of the subject invention, wherein the force transmitter (e.g., oil jets 90, 91) is mechanically isolated from the acceleration fields of the connecting rod 18, is that the signal that will ultimately activate the latch 50 is not affected by the acceleration of the connecting rod 18. Thus, when the actuator 52 is motivated to move, it does so substantially independently of the inertial forces created by the connecting rod 18.

The methods for carrying out this invention will be understood from the foregoing description and interrelationships between the various mechanical components.

Figures 20, 21:
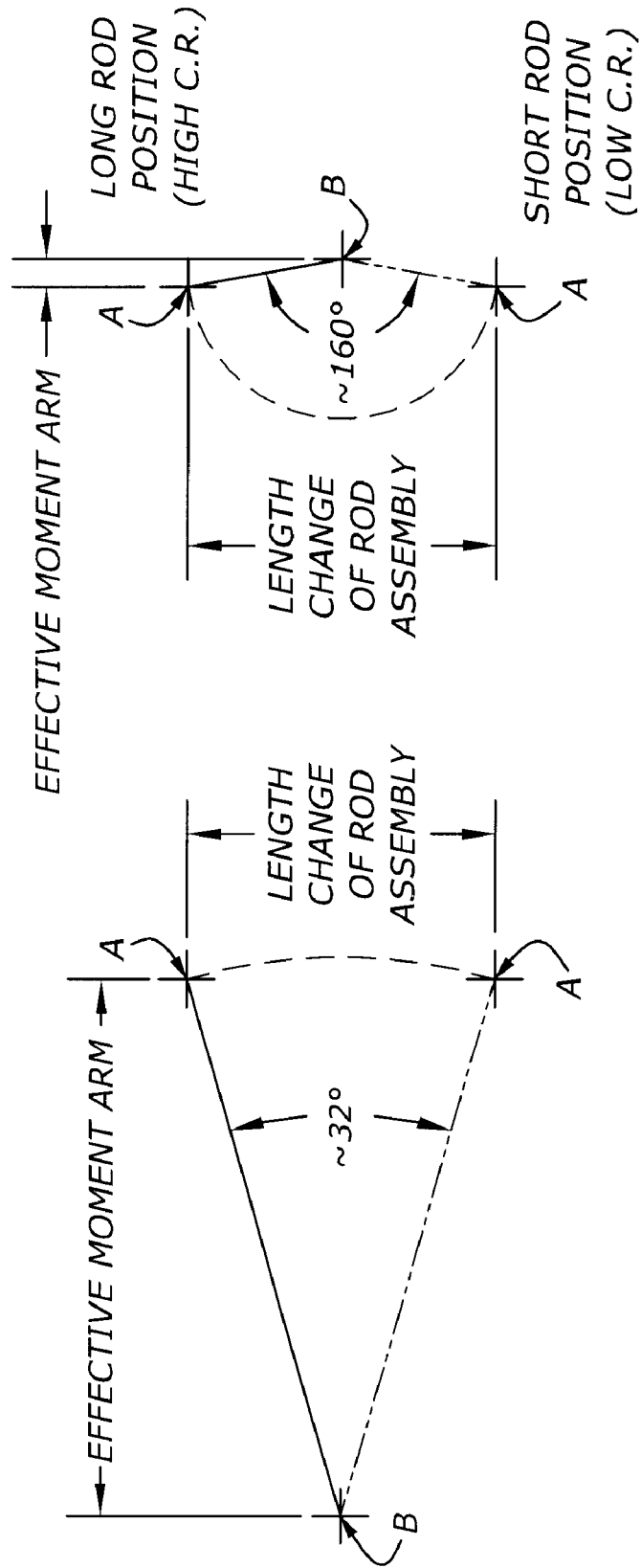
FIG. 20 is a spatial relationships diagram of the first and second axes in either of two rotated position that represent low and high compression ratio settings of the piston as accomplished by rotating the eccentric bushing, according to the subject invention.
FIG. 21 is a diagram as in FIG. 20 but illustrating a typical prior art construction wherein the eccentric bushing is rotated over a substantially larger range to accomplish an equivalent height adjustment of the piston.

Returning again to FIGS. 3, 4 and 20, illustrative dimensional reference lines have been added to describe the adjustment angle of the first axis A relative to the second axis B during movement of the connecting rod assembly 17 from its shorter, low compression ratio setting (FIG. 3) to its longer, high compression ratio setting (FIG. 4). FIG. 20 is especially instructive by comparison to a prior art eccentric bushing as illustrated in FIG. 21. Both FIGS. 20 and 21 are presented in greatly exaggerated scale to show how far (angularly) the eccentric bushings must rotate to give an effective connecting rod length change of about 3 mm, as an example.

The subject eccentric bushing 28, shown in FIG. 20, has an exemplary offset of about 5.5 mm between the first axis A of the piston pin 43 and the second axis B, which is the center of the eccentric bushing's 28 outer diameter. Since the two end positions of the eccentric bushing 28 rotation move the piston pin 43 approximately ±1.5 mm from a reference height of the second axis B, the total rotation of the eccentric bushing in this example is about 32°. This gives the force acting on the piston pin 43 a large effective moment arm to force rotation of the eccentric bushing 28. This large effective moment arm is an advantage because it allows the eccentric bushing 28 to start rotation very soon after the tensile/compressive load of the connecting rod 18 crosses the zero point (as shown on FIG. 12). As the great leverage makes it relatively easy for the connecting rod's tensile/compressive load to rotate the eccentric bushing 28, the eccentric bushing's rotation will reach the other end its travel quickly before the axial load of the connecting rod 18 has a chance to build up to high level of force. And consequently, the impact against the bumper (stop pin 80) along with noise and potential damage from the impact are minimized.

A potential disadvantage of having this large effective moment arm is that, during normal engine operation with either high or low compression ratio, the normal cyclical connecting rod 18 loads create large cyclical torques on the eccentric bushing 28, forcing the locking pins (i.e., bolts 54, 56) to resist those high cyclical torques. If the bolts 54, 56 were to fit into their mating holes 60, 62 with lash, or free play, that lash or free play would be moved from one extreme to the other each time that the axial load on the connecting rod 18 switches between tension and compression. Also, if the bolt 54, 56 does not have adequate strength and moment arm, its shearing load could exceed the shearing strength of the pin.

So, to completely eliminate lash or free play at the bolt 54, 56 to mating hole 60, 62 interface, the tips of the upper 54 and lower 56 bolts are gently tapered about 5-15° depending upon surface finish, lubrication properties and other factors influencing the coefficient of friction, with complementary tapers being formed in each of the holes 60, 62. The taper interface between bolt and hole provides a self-centering function to eliminate backlash between the bolts and the holes. The bolts 54, 56 are given enough axial travel to assure that there is always a residual spring force (via inner biasing member 70) urging the bolt 54, 56 into its hole 60, 62, even when it is completely engaged. The bolts 54, 56 are located as far out, radially, as possible from the second axis B (rotational axis of the eccentric bushing 28), because the flange plate 58 that carries the bolt holes 60, 62 thus gives the bolts 54, 56 a larger effective moment arm with which to resist the torque loads of the eccentric bushing 28.

When a tapered hole 60, 62 moves into registry with a spring loaded tapered bolt 54, 56, the taper effect makes the top end of the hole opening substantially larger than the leading small end of the bolt 54, 56. This means that even when the relative velocity between the hole 60, 62 and the bolt 54, 56 is great, the difference in size between the two members at initiation of engagement gives an increase in time available for the bolt 54, 56 to move axially into the hole 60, 62 before the hole moves out of alignment with the bolt 54, 56. Thus, the bolt 54, 56 should have substantial axial engagement into the hole 60, 62 by the time that the eccentric bushing flange 58 bounces off the stop post 80 and the tapered hole 60, 62 rebounds into the tapered bolt 54, 56.

In comparison, the prior art does not use a taper on the bolt or pin nor on the hole, and instead relies on extremely tight tolerances in hole and pin diameters and locations. As the hole moves toward alignment with the pin, the pin is allowed to achieve some axial velocity toward the engaged position by putting a ramp on the plate that carries the hole. For example, the material thickness at the leading edge of the hole is less than the material thickness at the far side of the hole. Thus, when the pin comes into alignment with the hole, its axial position is deep enough for it to contact the far side of the hole where the material is thicker. While colliding with the far side of the hole, the pin is supposed to continue its axial motion so that when it rebounds from the far side of the hole it has moved deep enough into the hole so that the original leading edge, where the material is thinner, will contact the pin and stop the rebound motion. However, because there is very little difference between the diameters of the hole and pin, the pin is expected to continue its axial motion into deeper engagement even while it is impacting the far side of the hole. The angular rotation and also the time period between initial impact at the far side and the second impact at the first side, after the rebound from the far side, are very small.

Figure 18:
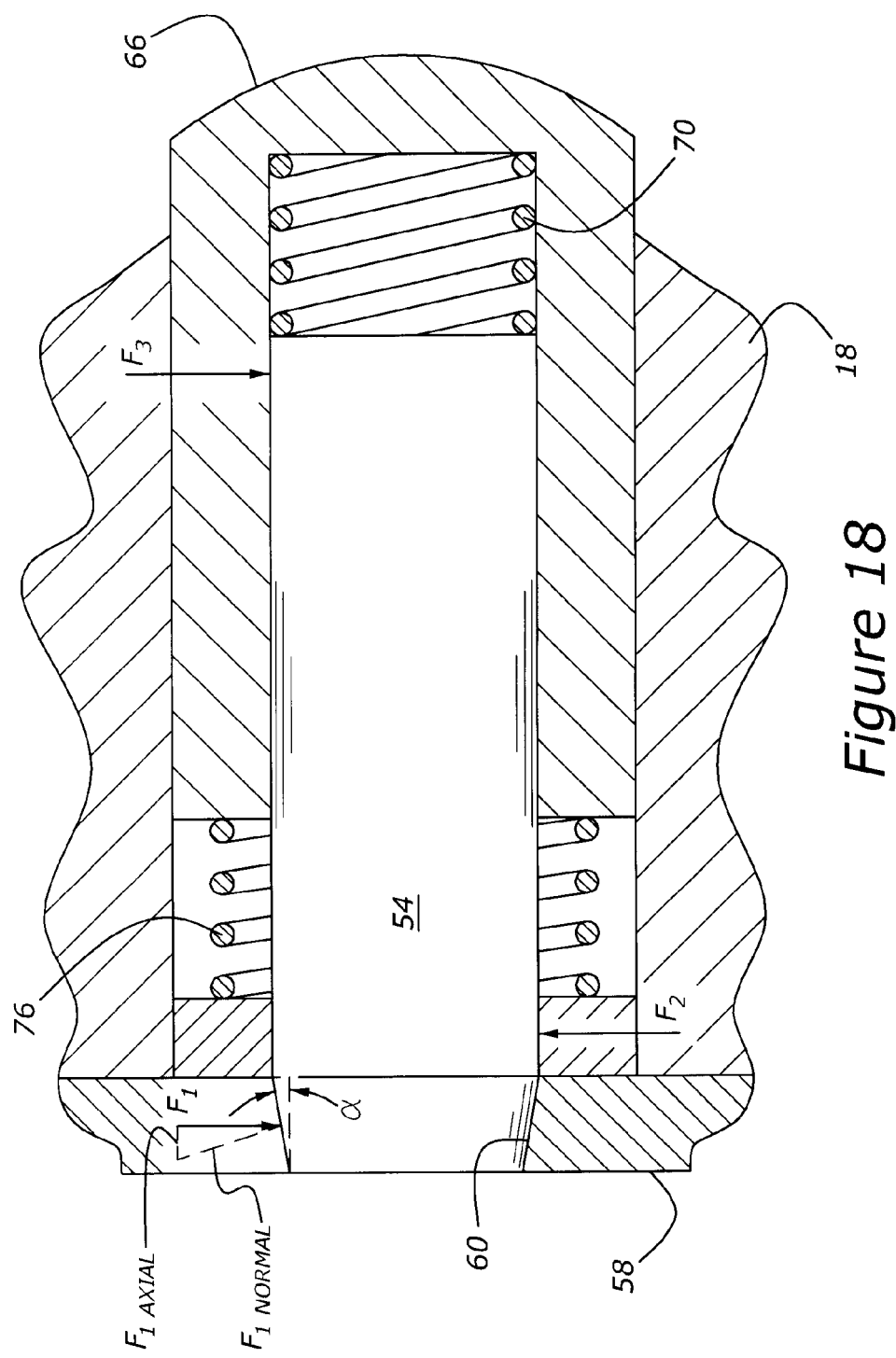
FIG. 18 is a cross-sectional view schematically illustrating the forces which act upon the bolt when a shearing load is applied from the flange plate of the eccentric bushing.

FIG. 18 represents a simplified force diagram pertaining to the bolts 54, 56. It shows the forces that act on the bolts 54, 56 when there is a shearing load from the eccentric bushing flange 58. At the tapered interface between bolt tip and hole, there is an axial force ($F_{1\ Axial}$) generated that tries to push the tapered tip out of the tapered hole 60, 62, but there is also friction present at the contacting surfaces. Because the shear load can be very large compared to the axial spring forces acting on the bolt, it is beneficial to assure that friction alone is sufficient to hold the bolt 54, 56 against the axial force ($F_{1\ Axial}$) that tends to push the bolt 54, 56 out of the hole 60, 62.

Figure 19A:
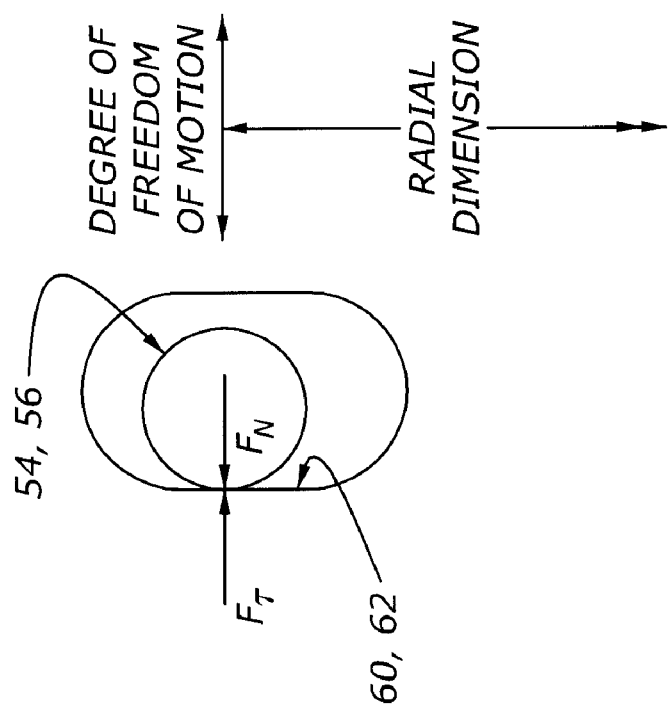
FIG. 19A illustrates the latch system of this invention wherein the extendable bolt is shown with a greater radial dimension than its mating hole.
Figure 19B:
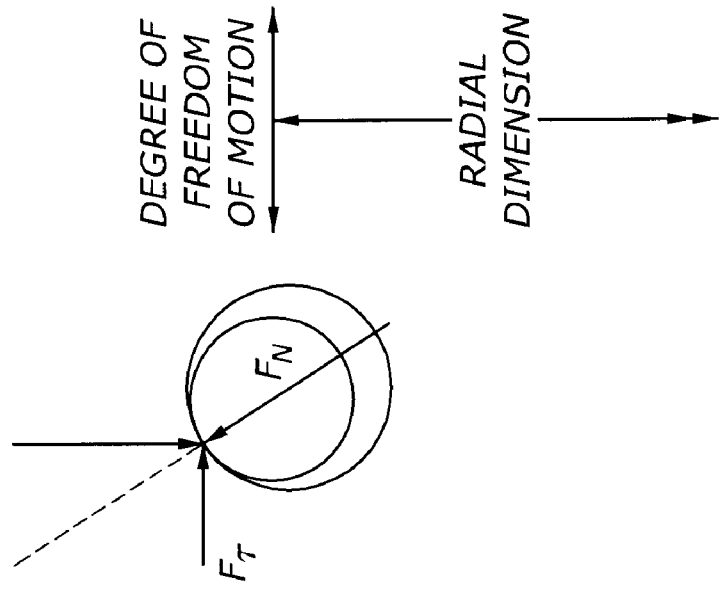
FIG. 19B is a view as in FIG. 19A but illustrating a typical prior art latch system wherein the bolt is also shown with a greater radial dimension than the mating hole, but the contact area is not normal to the degree of freedom of motion between the two parts due to misalignment.

Preferably, although not necessarily, the holes 60, 62 have an oblong shape, with the long axis aligned in a radial direction relative to the second axis B (i.e., the axis of rotation of the eccentric bushing 28 within its bore 24 in the piston end 22 of the connecting rod 18). This allows the bolts 54, 56 to fully engage their respective holes, even in the event of slightly imperfect alignment. Perhaps more importantly, however, this oblong shape of the holes 60, 62 creates a condition in which contact between the bolt and hole surfaces can occur along only two diametrically opposed lines. These lines of contact direct shear stresses through the center of the bolts 54, 56 in the same line of action as the degree of freedom of motion between the two parts, thus providing the greatest shear strength. FIGS. 19A and 19B illustrate this principal, with an exaggeration of scale to improve clarity. In FIG. 19A, which represents the preferred configuration with oblong holes, the bolt 54 or 56 is shown with a greater radial dimension than the mating hole 60 or 62, but the bolt contacts a flat of the hole, orienting the contact area normal to the degree of freedom of motion between the two parts. The force $F_N$ transferred to the bolt through the contact area is equal to the torsional load $F_\tau$ being restrained. In FIG. 19B, which represents prior art with round holes, the bolt is also shown with a greater radial dimension than the mating hole, but the contact area is not normal to the degree of freedom of motion between the two parts. This misalignment between the torsional load $F_\tau$ being restrained and the shear load transmitted to the bolt $F_N$ results in the shearing load within the bolt being larger than the torsional load being restrained. Said another way, the oblong shape of the holes 60, 62 prevents the sides (i.e., the sides radially aligned with the second axis B) of the bolts 54, 56 from contacting the round portions of the hole surfaces, thereby preventing any unfavorable misalignment between the torsional force being restrained and the shear force transmitted into the bolts 54, 56. If force transmission from the round portion of holes 60, 62 were permitted, which in the preferred embodiment is not, then the stresses associated with those forces would possibly jeopardize the structural integrity of the bolts 54, 56.

Referring now specifically to FIG. 21, the prior art uses a much smaller offset distance between the piston pin axis A and the center B of the eccentric bushing's outer diameter that establishes its rotational axis. With the smaller offset dimension, the prior art eccentric bushing must rotate through a greater angle to achieve the same change in connecting rod length. FIG. 21 suggests a total rotational angle of 160°, but that is just an example. The actual angles of the various prior art versions could be slightly larger or smaller. The significance, however, is that in all of the prior art, the end positions put the eccentric bushing in a position where the connecting rod axial force has a very small effective moment arm on the eccentric bushing. This may initially appear to be advantageous because the prior art eccentric bushing can be made smaller than the subject invention, and the latching features do not have to carry very much load during normal engine operation (i.e., when the eccentric bushing is locked in one position). Also, if the prior art latch pin-to-hole interface has a bit of lash, a small rotation of the bushing will not make a substantial change in the connecting rod total length. However, the disadvantage of this prior art configuration manifests during the switching of rod assembly length. Even with the latching feature completely disengaged, the eccentric bushing will not easily move away from its end position. As axial load builds on the connecting rod assembly after crossing the zero load point, the outer diameter of the eccentric bushing carries almost all of the load, and the friction at that surface will resist the small torque generated by the small effective moment arm. As the large (crank) end of the connecting rod moves sideways, it causes a rotation of the connecting rod that generates a torque at the eccentric bushing and eventually the eccentric bushing rotates enough for the connecting rod's axial force working on the (now larger) effective moment arm to accelerate rotation of the eccentric bushing. However, by this time the axial load on the connecting rod has increased to a substantial level and as the rod's length changes, a very large amount of available energy goes into the rotation of the bushing. The latching pin at the far end of the travel must then absorb all of this kinetic energy and may be damaged and make noise from the impact.

The subject invention, by contrast, is nimble and can switch easily and quickly with only low connecting rod axial forces. And, the total energy of impact at the end of travel (eccentric bushing rotation) will be much smaller. Quick switching times are also amplified in the subject invention by the effective use of an angular acceleration vector, i.e., an acceleration field created by rotational acceleration about the piston pin axis A. This feature will be described in greater detail subsequently.

Figure 22:
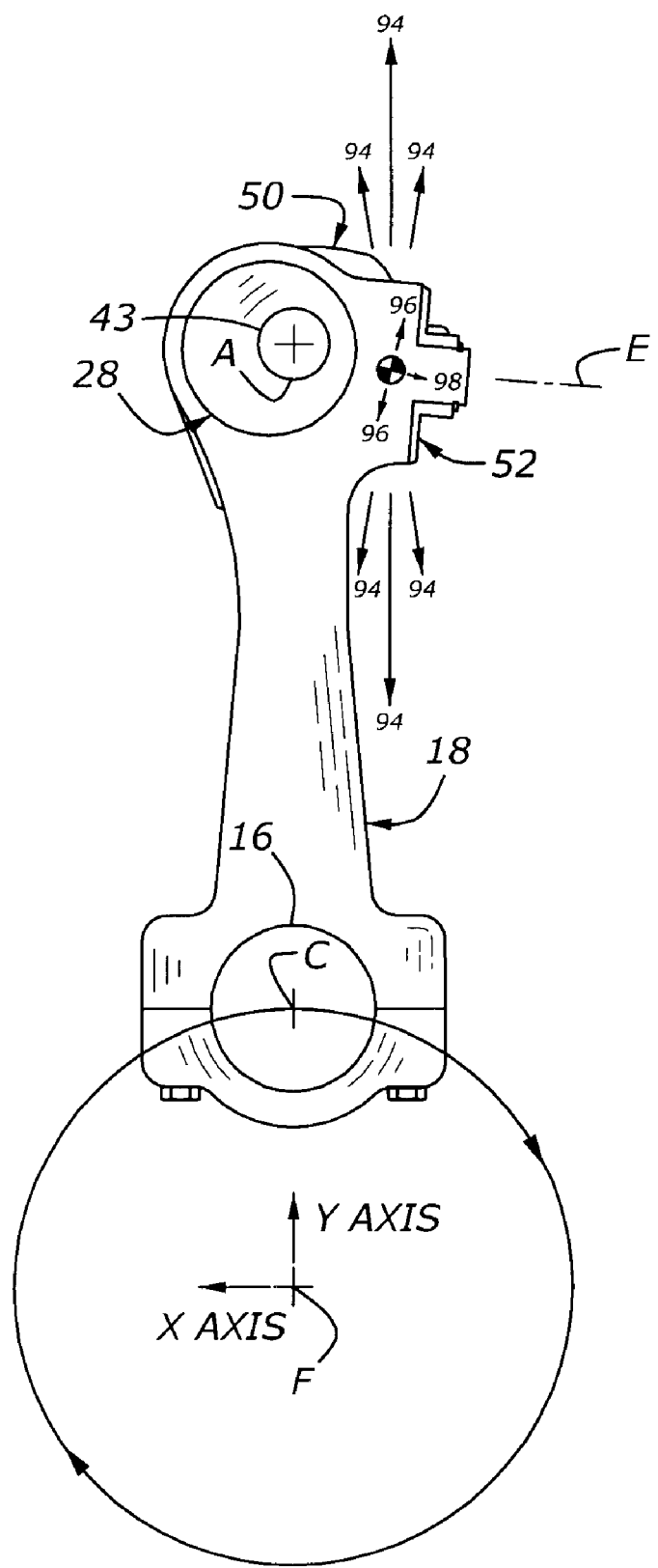
FIG. 22 shows the connecting rod in side elevation with the customary plurality of acceleration fields, or vectors, generated at the upper piston end as when operatively disposed in an engine, the acceleration vectors including stroking acceleration vectors extending along an imaginary axis passing perpendicularly through the first axis, angular acceleration vectors centered around the first axis, and centrifugal acceleration vectors radiating from the first axis.

FIG. 22 shows the predominant acceleration fields, or vectors, acting on the mechanisms of the latch 50 and actuator 52. The latch 50 and actuator 52 mechanisms, as described above, are comprised of several moveable components that are located in slightly different places. However, in the preferred embodiment, all of these moveable components are grouped closely enough about the upper piston end 22 of the connecting rod 18 that an analytical evaluation of the acceleration vectors at the middle of the group will yield informative results. So, for purposes of this explanation, it is sufficient to consider only a point along the stub shaft axis E, midway between the center lines of the upper and lower bolts 54, 56. Such an imaginary point would lie in the plane cut through the latch 50 and actuator 52 mechanisms, as shown in FIGS. 5-6.

From FIG. 22, it can be see that the large, crank end 20 of the connecting rod 18 rotates around the crankshaft axis F of rotation while the piston pin 43 reciprocates up and down in the cylinder 30. In other words, the general plane motion of the connecting rod 18 is forced to move like the link in a traditional slider-crank mechanism. By simultaneously moving the upper piston end 22 of the connecting rod 18 in a linear stroking direction and the lower crank end 20 in a rotary orbit, a plurality of acceleration vectors are created at the upper piston end 22. These acceleration vectors include stroking acceleration vectors 94, always parallel to the cylinder bore axis, angular acceleration vectors 96 centered around the first axis A, and centrifugal acceleration vectors 98 radiating from the first axis A.

The stroking acceleration vector 94 is always parallel to the cylinder bore 30 and thus varies in direction relative to the connecting rod. This acceleration vector 94 acts on the piston 26 mass and, along with gas pressure forces acting on the piston 26 along that same line of action, creates an axial force within the connecting rod 18 to cause changes in length when the latch 50 allows it to do so. It is desirable and even perhaps necessary to have the degree of freedom of the length changing mechanism to substantially align with this stoking acceleration vector 94, but it is not desirable that the latch 50 should tend to unlatch because of the forces created by this acceleration vector 94 or any other forces present during normal engine operation.

At the upper piston end 22 of the connecting rod 18, there is also an effect from angular acceleration, indicated by the number 96, due to the side-to-side motion at the connecting rod's large crank end 20 making the whole connecting rod 18 pivot back and forth about the piston pin axis A. At the reference point, which is part of the connecting rod assembly, the forces generated by this angular acceleration 96 are perpendicular to a radial line from the piston pin axis A to the point of interest, and vary from positive to negative, with zero force occurring at top and bottom dead center positions of the piston.

When the connecting rod 18 is rocking back and forth about the piston pin 43, there is also a centrifugal acceleration vector 98 at the point of interest. The centrifugal acceleration vector 98 is always directed radially outward from the first axis A, passing through the stub shaft axis E of the actuator 52. The magnitude of the centrifugal acceleration vector 98 is quite small and varies from zero to positive; it is never negative (directed radially inwardly toward the piston pin 43).

In a hypothetical single cylinder engine 14, all of the relevant acceleration vectors acting on the upper piston end 22 of the connecting rod 18 are contained in the single plane shown in FIG. 22. There are no forces directed fore and aft, i.e., in a Z axis direction relative to the crank axis F, nor are there any moments that would tend to pitch the engine about the X axis. Pitching, of course, is oscillation between nose down with tail up and nose up with tail down.

The only degree of freedom in the latch bolts 54, 56 is fore and aft, i.e., aligned with the Z axis direction; there are no unbalanced acceleration forces that would tend to actuate the latching bolts 54, 56. The only degree of freedom of the actuator 52 is rotation about the stub shaft axis E which is generally parallel with the X axis. Since the hypothetical single cylinder engine 14 does not generate a pitching couple nor a yawing couple (oscillation between front right with left rear, and vice versa), the normal single cylinder operation does not generate any acceleration vectors that can force rotation of the actuator 52. However, toward this end, it is helpful that the actuator 52 be properly balanced, both dynamically and statically. Static unbalance is the situation that would occur if the counterweight 92 had too much or not enough mass to offset the mass of the cam 64. If the cam 64 were heavier or lighter than appropriate, each up and down stroking acceleration 94 would tend to rotate the actuator 52. Dynamic unbalance is the situation that would occur if the counterweight 92 were too far or too close to the piston pin 43 as compared to the position of the cam 64. In the angular acceleration vector 96, the magnitude of the acceleration is proportional to the distance from the axis of rotation (A), so if the counterweight 92 were too far from the piston pin 43, with each angular acceleration of the connecting rod 18 the unbalanced forces between the counterweight 92 and the cam 64 would tend to make the actuator 52 rotate.

Of course, on multi-cylinder engines 14 there may be unbalanced pitching and yawing couples present, and these unbalanced pitching and yawing couples may align with one or more degrees of freedom of some moveable components in the latch 50 and actuator 52 mechanisms. However, the pitching and yawing couples in multi-cylinder engines are resisted by the inertia of the entire power train structure, and thus the unfavorable accelerations on the latch 50 and/or actuator 52 mechanisms due to their effects are several orders of magnitude smaller than the accelerations present at a single piston engine 14 as described above.

Accordingly, any and all relevant forces and moments generated by the connecting rod 18 during actual use in an engine 14 will not influence the latch 50 nor the actuator 52 to inadvertently move because all moveable components in these two mechanisms are constrained to move only in directions that are generally perpendicular relative to each of the stroking 94, angular 96 and centrifugal 98 acceleration vectors.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A variable compression ratio piston and rod assembly for an internal combustion engine, said assembly comprising:
    a piston having a pin bore centered along a first axis;
    a piston pin disposed in said pin bore;
    a connecting rod having a lower crank end and an upper piston end, said upper piston end including a rod bore centered along a second axis that is offset from and parallel to said first axis of said pin bore;
    an eccentric bushing pivotally interconnecting said piston pin and said rod bore, said eccentric bushing including a bore along said first axis that receives said piston pin and an eccentric outer journaled portion carried in said rod bore, said eccentric bushing being rotatable so as to effect a spatial displacement between said piston and said connecting rod to effectively alter the compression ratio created by said assembly when operatively disposed in an internal combustion engine;
    an actuator selectively energizable for producing an actuation impulse;
    a latch responsive to said actuation impulse for movement between a latched position in which said eccentric bushing is fixed in one of at least two rotated positions, and an unlatched position in which said eccentric bushing is freely moveable relative to said connecting rod; and
    a lost motion coupling operatively disposed between said actuator and said latch, said lost motion coupling functionally decoupling said actuator from said latch in response to a dominant shearing load between said eccentric bushing and said connecting rod trapping said latch in said latched position and for automatically re-coupling said actuator to said latch when the dominant shearing load falls below a predetermined limit, whereby said lost motion coupling enables said actuator to produce said actuation impulse while said latch remains trapped in said latched position without damaging said latch and also automatically moving said latch to said unlatched position at a later convenient time.

2. The assembly as set forth in claim 1 wherein said latch includes a first bolt for fixing said eccentric bushing in a first one the at least two rotated positions, and a second bolt spaced from said first bolt for fixing said eccentric bushing in a second one of the at least two rotated positions.

3. The assembly of claim 2 wherein said lost motion coupling includes a first follower telescopically affixed to said first bolt and a second follower telescopically affixed to said second bolt.

4. The assembly of claim 3 wherein said actuator includes a cam operatively engageable with said first and second followers.

5. The assembly as set forth in claim 4 wherein said actuator includes at least one nozzle to produce an oil stream.

6. The assembly of claim 4 wherein said actuator includes a counterbalance weight.

7. The assembly of claim 1 wherein said lower crank end of said connecting rod includes a crank bore axis, and said connecting rod includes an imaginary rod center line extending longitudinally through said crank bore axis and said second axis, and wherein said first axis of said pin bore is laterally offset from said rod center line and remains laterally offset during selective rotation of said eccentric bushing between said at least two rotated positions.

8. The assembly of claim 1 wherein said eccentric bushing includes a flange plate having at least one hole therein for receiving said latch in said latched position.

9. The assembly of claim 8 wherein said flange plate includes an arcuate slot centered relative to said second axis in said rod bore, and further including a stop post extending from said connecting rod, said stop post in operative registry with said arcuate slot for limiting rotational travel of said eccentric second journal relative to said connecting rod.

10. The assembly of claim 1 wherein said latch includes a first bolt for fixing said eccentric second journal in a first one of the at least two arcuately spaced positions, and said lost motion coupling includes a first follower telescopically affixed to said first bolt, and a biasing member operatively disposed between said first bolt and said first follower.

11. A method for dynamically varying the compression ratio of a piston and rod assembly for an internal combustion engine, said method comprising:
    providing a connecting rod having a lower crank end and an upper piston end;
    providing a piston;
    pivotally interconnecting the upper piston end of the connecting rod to the piston with an eccentric bushing;
    selectively rotating the eccentric bushing to spatially displace the piston relative to the connecting rod thereby effectively altering the compression ratio created by the assembly during crank-driven reciprocating movement within the internal combustion engine;
    providing a latch movable to a latched position for holding the piston in either of two spatially displaced conditions relative to the connecting rod;
    selectively urging the latch to move to an unlatched position in which the piston and the connecting rod are freely extendable relative to each other;
    subjecting the connecting rod to cyclical modes of compression and tension during crank-driven reciprocating movement within the internal combustion engine; and
    temporarily immobilizing the latch in the latched position during said selectively urging the latch to move to the unlatched position until such time as the connecting rod is in transition between the compression and tension modes, whereby after said urging step the latch remains trapped in its latched position but automatically moves to the unlatched position when the connecting rod transitions from compression-to-tension mode or from tension-to-compression mode.

12. The method of claim 11 wherein the latch includes first and second spaced apart bolts each independently movable between latched and unlatched positions, and wherein said selectively urging the latch to move to an unlatched position includes simultaneously urging the first bolt toward its unlatched condition and urging the second latch towards its latched condition.

13. The method of claim 11 wherein said spatially displacing the piston relative to the connecting rod includes rotating an eccentric bushing.

14. The method of claim 11 wherein said selectively urging the latch to move to an unlatched position includes rotating a cam.

15. The method of claim 14 wherein said rotating a cam includes discharging a pressurized stream of oil.

16. The method of claim 14 wherein said rotating a cam includes actuating an extendable plunger in response to the occurrence of predetermined event.

* * * * *